(12) United States Patent
Chidester et al.

(10) Patent No.: US 11,539,087 B2
(45) Date of Patent: Dec. 27, 2022

(54) VEHICLE ENERGY-STORAGE SYSTEMS

(71) Applicant: Faraday&Future Inc., Gardena, CA (US)

(72) Inventors: Douglas D. Chidester, San Pedro, CA (US); Nicholas John Sampson, Rancho Palos Verdes, CA (US)

(73) Assignee: Faraday & Future Inc., Gardena, CA (US)

( * ) Notice: Subject to any disclaimer, the term of this patent is extended or adjusted under 35 U.S.C. 154(b) by 48 days.

(21) Appl. No.: 15/859,072

(22) Filed: Dec. 29, 2017

(65) Prior Publication Data

US 2018/0254536 A1 Sep. 6, 2018

Related U.S. Application Data

(60) Provisional application No. 62/440,324, filed on Dec. 29, 2016.

(51) Int. Cl.

| | |
|---|---|
| *H01M 10/6568* | (2014.01) |
| *H01M 2/10* | (2006.01) |
| *H01M 10/613* | (2014.01) |
| *H01M 10/625* | (2014.01) |
| *H01M 10/643* | (2014.01) |
| *H01M 10/42* | (2006.01) |
| *H01M 50/20* | (2021.01) |

(52) U.S. Cl.
CPC ... *H01M 10/6568* (2015.04); *H01M 10/4257* (2013.01); *H01M 10/613* (2015.04); *H01M 10/625* (2015.04); *H01M 10/643* (2015.04); *H01M 50/20* (2021.01); *H01M 2220/20* (2013.01)

(58) Field of Classification Search
None
See application file for complete search history.

(56) References Cited

U.S. PATENT DOCUMENTS

2009/0220852 A1* 9/2009 Fujii .................. H01M 2/1077
429/72

* cited by examiner

*Primary Examiner* — Zhongqing Wei
(74) *Attorney, Agent, or Firm* — Veros Legal Solutions, LLP

(57) ABSTRACT

The present disclosure is directed to energy storage systems for vehicles. In some aspects, the energy storage system may be used to power an electric automobile. The energy storage system may include a plurality of individual battery cells. The cells may be cylindrical and have a positive and negative terminal on the same side. The cells may be physically and/or electrically organized into bricks. The bricks may be physically and/or electrically organized into modules. The modules may be physically and/or electrically organized into strings. The strings may be physically and/or electrically organized into a pack. In some embodiments, packs, strings, modules and/or bricks may include flexible circuitry and/or may be liquid cooled.

6 Claims, 21 Drawing Sheets

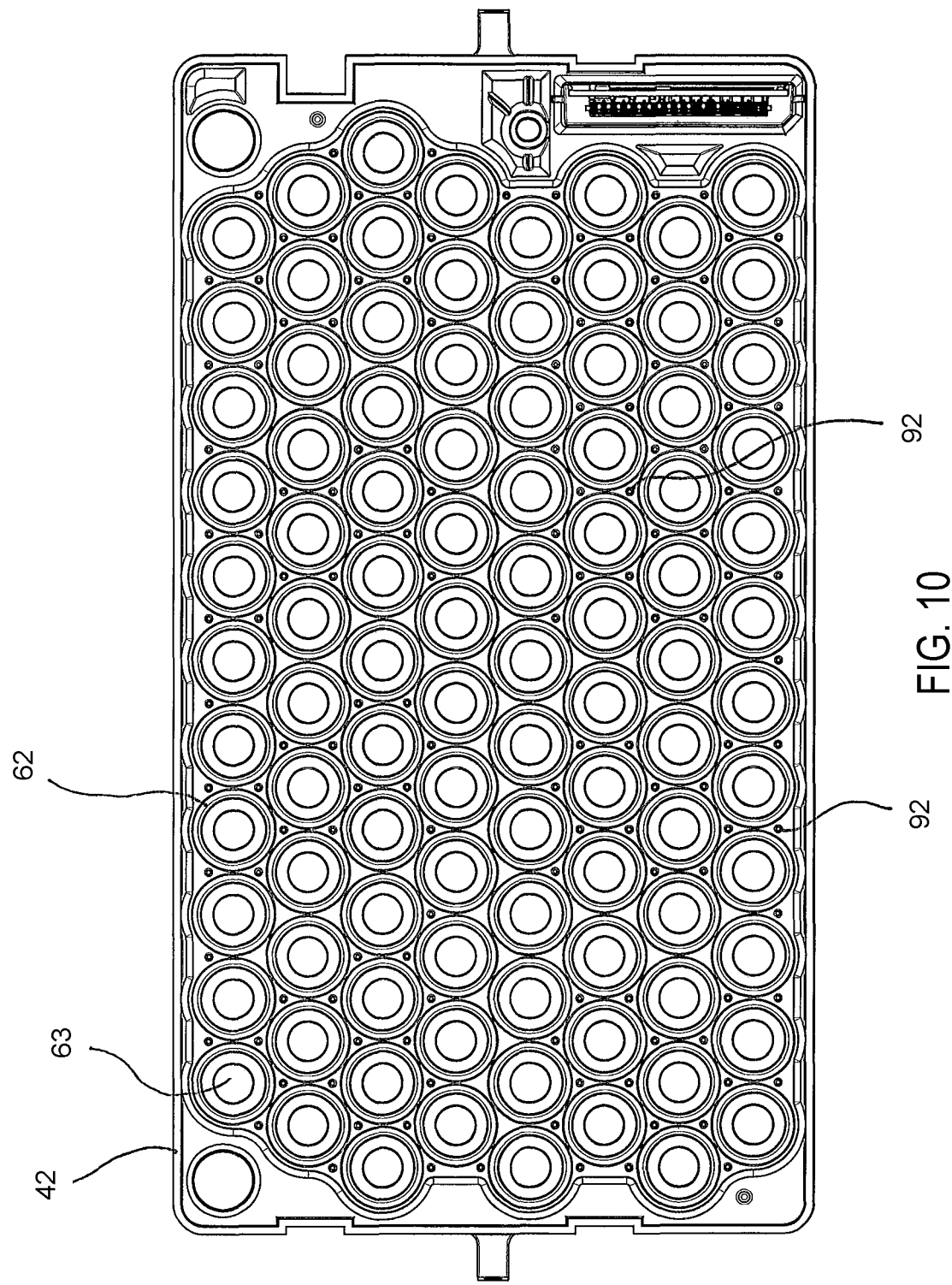

VEHICLE ENERGY-STORAGE SYSTEMS

CROSS-REFERENCE TO RELATED APPLICATIONS

This application claims the benefit of U.S. Provisional Application No. 62/440,324, filed Dec. 29, 2016, the entirety of which is hereby incorporated by reference.

FIELD

The present application relates generally to energy-storage systems, and more specifically to energy-storage systems for vehicles.

BACKGROUND

Electric-drive vehicles may reduce the impact of fossil-fuel engines on the environment and increase the sustainability of automotive modes of transportation. Energy-storage systems are essential for electric-drive vehicles, such as hybrid electric vehicles, plug-in hybrid electric vehicles, and all-electric vehicles. Size, efficiency, and safety are important considerations for these energy-storage systems. Spatially efficient storage, improved thermal management, and balance among battery cells, promote these goals.

SUMMARY

The systems and methods of this disclosure each have several innovative aspects, no single one of which is solely responsible for its desirable attributes. Without limiting the scope as expressed by the claims that follow, its more prominent features will now be discussed briefly. The electrical and mechanical arrangement of the components described herein have several advantages over the prior art. For example, the individual battery cells may be subject to less cycling, thus increasing battery lifetime. The individual batteries cells may include terminals on only one end of a cylindrical body—simplifying manufacturing. The configurations of battery cells within liquid cooled modules may provide increased energy storage density.

In some embodiments, modular energy-storage systems are described. An electric vehicle battery pack may include a plurality of independently removable battery strings. Each battery string may include a plurality of battery modules. Each battery module may include a plurality of electrochemical cells. The cells may be organized into rows and columns. In some aspects, cells are electrically coupled in parallel and/or in series. The electrochemical cells may be disposed within various cell holder structures, and may be electrically connected by flexible circuitry. Coupling of various components within the battery pack, strings, and/or modules may be accomplished by pressure fitting, snap fitting, welding such as laser welding, application of adhesive chemicals, or other coupling methods. In some embodiments, battery packs, strings, and/or modules may be liquid cooled.

BRIEF DESCRIPTION OF THE DRAWINGS

FIG. 3B is a block diagram of an example voltage source and battery management system such as shown in FIG. 3A wherein the module monitoring boards are provided in the same enclosure with the respective batteries they are associated with.

FIG. 10 shows a housing with a bottom battery retainer installed in the cavity.

DETAILED DESCRIPTION

The following description is directed to certain implementations for the purpose of describing the innovative aspects of this disclosure. However, a person having ordinary skill in the art will readily recognize that the teachings herein can be applied in a multitude of different ways. FIGS. 1-16 illustrate exemplary components, methods, and systems for use in electric vehicles. Exemplary systems may include a battery pack organized as strings having current carriers and battery modules. Such systems may be implemented in any type of vehicle. For example, the vehicle may be a car, truck, semi-truck, motorcycle, plane, train, moped, scooter, or other type of transportation. Furthermore, the vehicle may use many types of powertrain. For example, the vehicle may be an electric vehicle, a fuel cell vehicle, a plug-in electric vehicle, a plug-in hybrid electric vehicle, or a hybrid electric vehicle. Though described with reference to vehicle components, the exemplary current carriers and battery modules are not limited to use in vehicles. For example, the current carriers and battery modules may be used to power domestic or commercial appliances.

In some embodiments, a battery management system design implemented with multiple battery strings for an electric vehicle is disclosed. In this implementation, there is one string control unit for each battery string and multiple module monitoring boards for module voltages and temperature measurements. A single battery pack controller is used to simplify the interaction of other controllers in the vehicle with the multiple strings. Each battery string is also coupled to a current sensor and a set of contactors.

Figure 1:
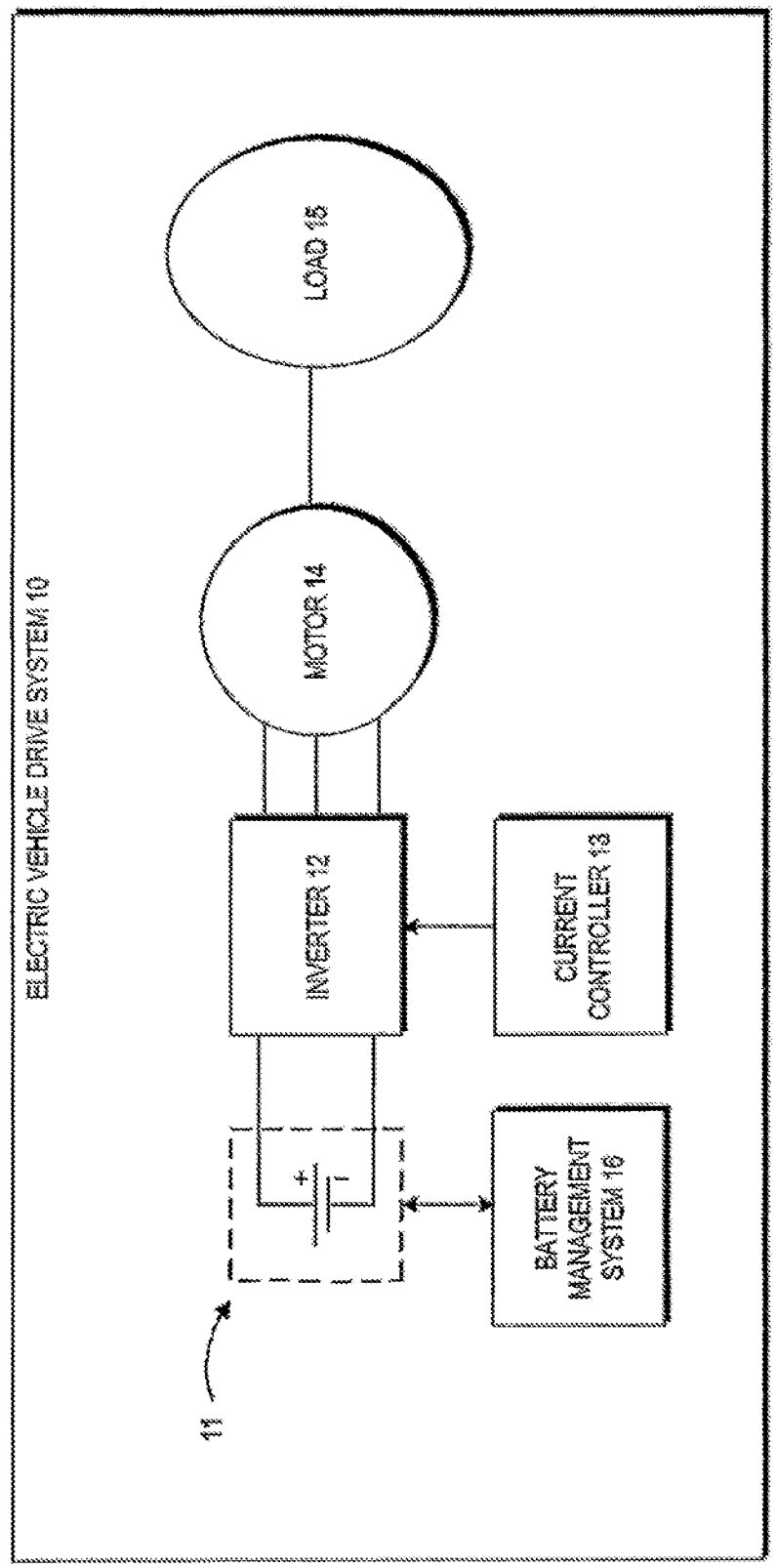
FIG. 1 depicts a block diagram of an example electric vehicle drive system including a battery management system as described herein.

FIG. 1 depicts a block diagram of an example electric vehicle drive system 10 including a battery management system 16 as described herein. The electric vehicle drive system 10 includes the battery or voltage source 11, an inverter 12 coupled to the battery 11, a current controller 13, a motor 14, and load 15, and the battery management system 16. The battery 11 can be a single phase direct current (DC) source. In some embodiments, the battery 11 can be a rechargeable electric vehicle battery or traction battery used to power the propulsion of an electric vehicle including the drive system 10. Although the battery 11 is illustrated as a single element in FIG. 1, the battery 11 depicted in FIG. 1 is only representational, and further details of the battery 11 are discussed below in connection with FIG. 2.

The inverter 12 includes power inputs which are connected to conductors of the battery 11 to receive, for example, DC power, single-phase electrical current, or multi-phase electrical current. Additionally, the inverter 12 includes an input which is coupled to an output of the current controller 13, described further below. The inverter 12 also includes three outputs representing three phases with currents that can be separated by 12 electrical degrees, with each phase provided on a conductor coupled to the motor 14. It should be noted that in other embodiments inverter 12 may produce greater or fewer than three phases.

The motor 14 is fed from voltage source inverter 12 controlled by the current controller 13. The inputs of the motor 14 are coupled to respective windings distributed about a stator. The motor 14 can be coupled to a mechanical output, for example a mechanical coupling between the motor 14 and mechanical load 15. Mechanical load 15 may represent one or more wheels of the electric vehicle.

Controller 13 can be used to generate gate signals for the inverter 12. Accordingly, control of vehicle speed is performed by regulating the voltage or the flow of current from the inverter 12 through the stator of the motor 14. There are many control schemes that can be used in the electric vehicle drive system 10 including current control, voltage control, and direct torque control. Selection of the characteristics of inverter 12 and selection of the control technique of the controller 13 can determine efficacy of the drive system 10.

The battery management system 16 can receive data from the battery 11 and generate control signals to manage the battery 11. Further details of the battery management system 16 are discussed in connection with FIGS. 2-3 below.

Although not illustrated, the electric vehicle drive system 10 can include one or more position sensors for determining position of the rotor of the motor 14 and providing this information to the controller 13. For example, the motor 14 can include a signal output that can transmit a position of a rotor assembly of the motor 14 with respect to the stator assembly motor 14. The position sensor can be, for example, a Hall-effect sensor, potentiometer, linear variable differential transformer, optical encoder, or position resolver. In other embodiments, the saliency exhibited by the motor 14 can also allow for sensorless control applications. Although not illustrated, the electric vehicle drive system 10 can include one or more current sensors for determining phase currents of the stator windings and providing this information to the controller 13. The current sensor can be, for example, a Hall-effect current sensor, a sense resistor connected to an amplifier, or a current clamp.

It should be appreciated that while the motor 14 is depicted as an electrical machine that can receive electrical power to produce mechanical power, it can also be used such that it receives mechanical power and thereby converts that to electrical power. In such a configuration, the inverter 12 can be utilized to excite the winding using a proper control and thereafter extract electrical power from the motor 14 while the motor 14 is receiving mechanical power.

Figure 2:
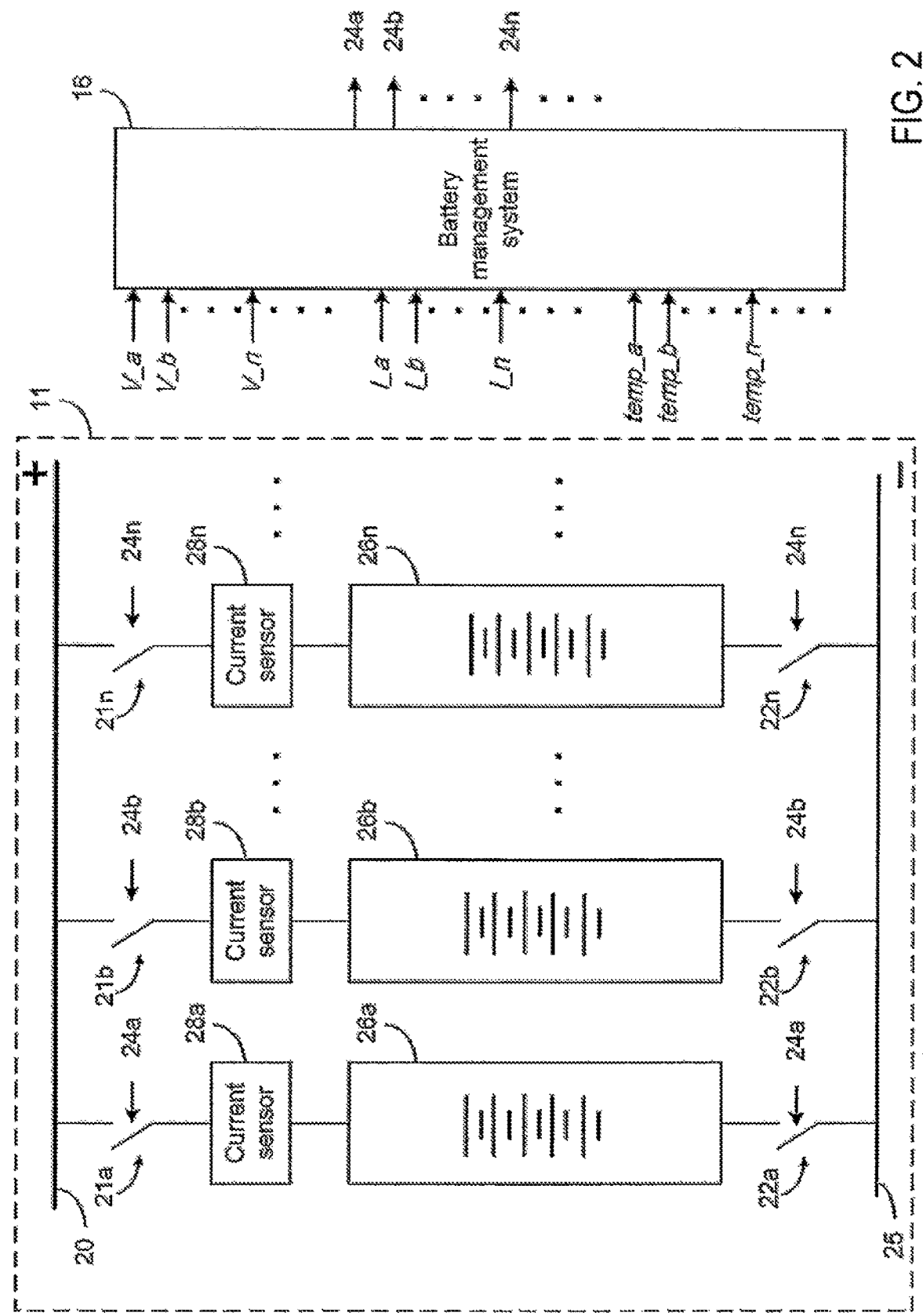
FIG. 2 is a block diagram of an example voltage source according to one embodiment.

FIG. 2 is a block diagram of an example voltage source according to one embodiment. The voltage source 11 can include a plurality of battery strings 26a, 26b, . . . 26n, . . . , individually or collectively referred to herein as the battery string(s) 26, and a plurality of current sensors 28a, 28b, . . . , 28n, . . . , individually or collectively referred to herein as the current sensor(s) 28. The battery strings 26 can be individually connected to or disconnected from a positive or high power bus 20 and a negative or low power bus 25 through a plurality of switches 21a, 21b, . . . , 21n, . . . , and 22a, 22b, . . . , 22n, . . . , individually or collectively called the switches 21 and 22. The switches 21 and 22 can be controlled by control signals from a battery management system 16. The battery management system 16 can receive, among others, voltages, $V\_a$, $V\_b$, . . . , $V\_n$, . . . , which are output voltages across the respective battery strings 26a, 26b, . . . , 26n, . . . , determined using, for example a plurality of sensors (not shown). The battery management system 16 can also receive currents, $I\_a, I\_b, \ldots, I\_n, \ldots$, which are currents from the respective battery strings 26a, 26b, . . . , 26n, . . . , measured by the respective current sensors 28a, 28b, . . . , 28n, . . . . The battery management system 16 also can receive temperature measurements, temp_a, temp_b, . . . , temp_n, . . . , which are one or more of temperature measurements from the respective battery strings 26a, 26b, . . . 26n, . . . , measured by one or more temperature sensors (not shown) accompanying the battery strings. Based at least in part on the voltages, $V\_a, V\_b, \ldots, V\_n, \ldots$, currents, $I\_a, I\_b, \ldots, I\_n, \ldots$, and/or temperatures, temp_a, temp_b, . . . , temp_n, of the respective battery strings 26, the battery management system 16 can generate control signals 24a, 24b, . . . , 24n, . . . , individually or collectively referred to herein as the control signal(s) 24, for controlling the respective switches 21 and 22. Further details of the battery management system 16 are discussed below in connection with FIG. 3.

The battery strings 26 can include a plurality of modules, each of which in turn can include a plurality of cells. Within each battery string 26, the constituent modules and cells can be connected in series as symbolically depicted in FIG. 2. In some embodiments, the voltage source 11 can include six battery strings 26 that can be connected to or disconnected from the power buses 20, 25. The battery strings 26 can be implemented with various different types of rechargeable batteries made of various materials, such as lead acid, nickel cadmium, lithium ion, or other suitable materials. In some embodiments, each of the battery strings can output about 375V-400V if charged about 80% or more.

The current sensors 28 can be connected in series with the respective battery strings 26 between the high and low power buses 20, 25. As shown in FIG. 2 the current sensor 28 can be connected to the positive side of the respective battery strings 26 to measure the current discharged from the battery strings 26. In other embodiments, the current sensors 28 can be connected to the battery strings 26 otherwise to measure the current flow due to discharging of the battery strings 26.

The switches 21 and 22 can be contactors configured to connect the battery strings 26 to the power buses 20, 25 or disconnect the battery strings 26 from the power buses 20, 25 in response to the respective control signals 24. The switches 21 can be implemented with any suitable contactors capable of handling the level of current and voltage as needed in connection with, for example, the battery strings 26, the power buses 20, 25, and the load 15 (FIG. 1) within the electric vehicle drive system 10 (FIG. 1). In some embodiments the switches 21 and 22 can be implemented with mechanical contactors with solenoid inside. In some embodiments, the switches 21 can be powered by one or more drivers in the battery management system 16. Although in the illustrated example in FIG. 2, the switches 21 (e.g., 21n) and the switches 22 (e.g., 22n) are controlled by the same respective control signals 24 (e.g., 24n), in other embodiments, the switches 21 (e.g., 21n) can be controlled by respective positive bus connect control signals while the switches 22 (e.g., 22n) can be controlled by respective negative bus connect control signals.

The battery management system 16 can include a plurality of passive and/or active circuit elements, signal processing components, such as analog-to-digital converters (ADCs), amplifiers, buffers, drivers, regulators, or other suitable components. In some embodiments, the battery management system 16 can also include one or more processors to process incoming data to generate outputs, such as the control signals 24. In some embodiments, the battery management system 16 can also include one or more components for communicating and sending and receiving data within the battery management system 16 and/or with other components or circuitries in the electric vehicle. For example, the various components and circuits within the system 10, including components in the battery management system 16 can be in communication with one another using protocols or interfaces such as a CAN bus, SPI, or other suitable interfaces. And in some embodiments, the processing of incoming data can be at least in part performed by other components not in the battery management system 16 within the electric vehicle as the battery management system 16 communicates with other components.

Figure 3A:
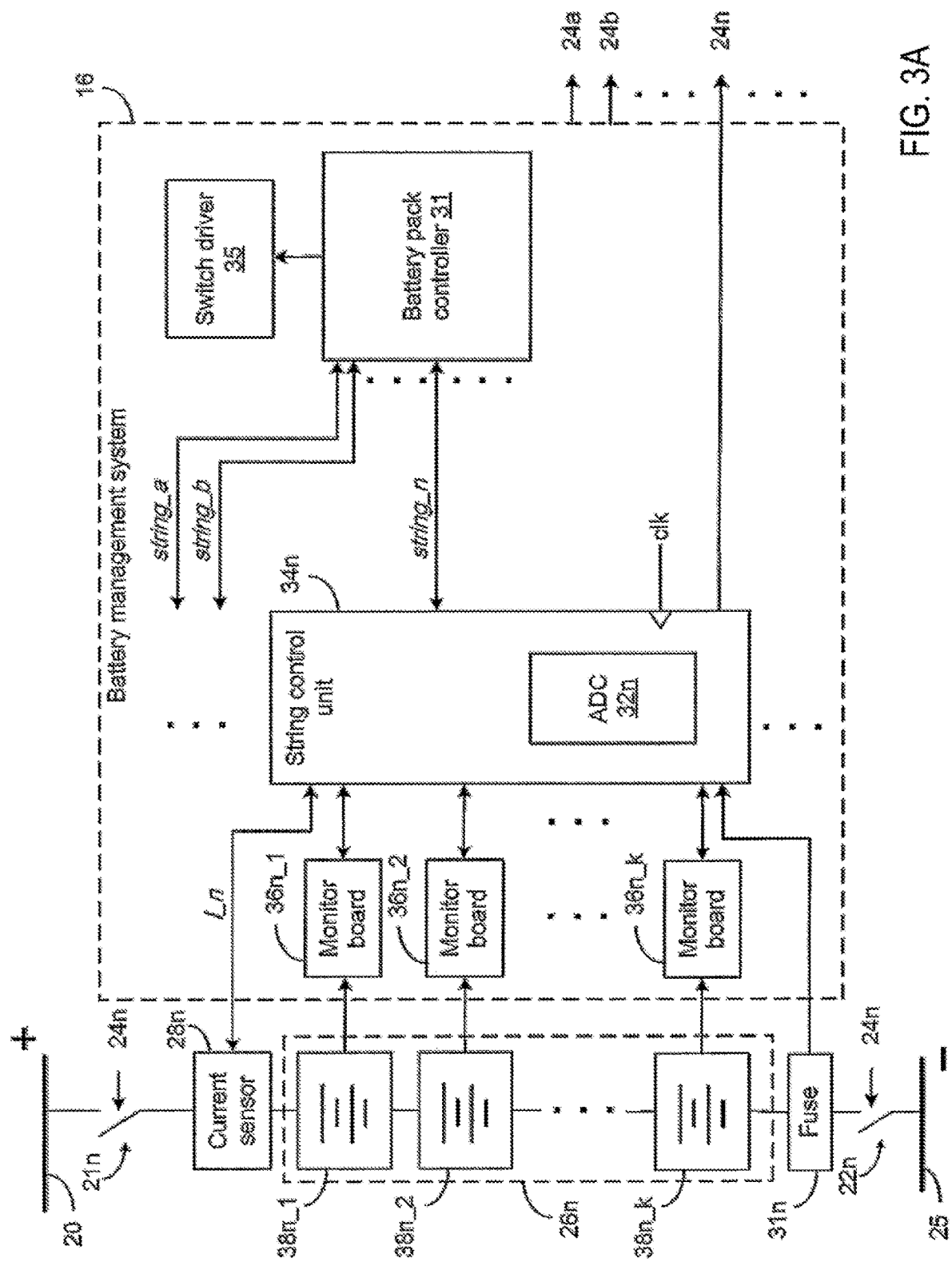
FIG. 3A is another block diagram of an example voltage source and battery management system according to one embodiment.

FIG. 3A is another block diagram of an example voltage source and battery management system according to one embodiment. In FIG. 3A, one exemplary battery string 26n of the plurality of battery strings 26 of FIG. 2 is illustrated, and accordingly, the corresponding current sensor 28n, switches 21n, 22n, and connect control signal 24n are illustrated. Also illustrated is a fuse 31n corresponding to the battery string 26n, and although not illustrated, the battery strings 26a, 26b, . . . , 26n, . . . in FIG. 2 may each also have corresponding fuse 31a, 31b, . . . , 31n, . . . . The battery string 26n includes a plurality of battery modules 38n_1, 38n_2, . . . , 38n_k (individually or collectively referred to herein as 38n for the battery string 26n), each sending battery module telemetry data to respective module monitoring boards 36n_1, 36n_2, . . . , 36n_k (individually or collectively referred to herein as 36n for the battery string 26n) of the battery management system 16. The battery management system 16 includes a string control unit 34n for the battery string 26n in communication with the battery modules 38n_1, 38n_2, . . . , 38n_k for the battery string 26n. The battery management system 16 can include an analog-to-digital converter (ADC) 32n for processing analog data from the battery string 26n. In some embodiments, the ADC 32n can be internal to the string control unit 34n, and in other embodiments, the ADC 32n can be separate from the string control unit 34n. Although not illustrated, the battery management system 16 also may include respective string control units 34a, 34b, . . . , 34n, . . . and respective ADCs 32a, 32b, . . . , 32n, . . . for the plurality of battery strings 26a, 26b, . . . , 26n, . . . illustrated in FIG. 2. The battery management system 16 also includes a battery pack controller 31, which controls a switch driver 35 and is in communication with the plurality of string control units 34.

In the illustrated embodiment, the nth battery string 26n has k number of battery modules 38n and k number of module monitoring boards 36n. In some embodiments, one battery string 26 may include, for example 6 battery modules 38 in series. In some embodiments, one battery module 38 may include, for example, 16 battery bricks in series, and a battery brick may include 13 battery cells in parallel. Also, in some embodiments the voltage source 11 (FIG. 1) of the electric vehicle drive system 10 (FIG. 1) can include 1 battery pack, which includes, for example 6 battery strings 26. A battery cell can be, for example, a Li-ion cell, and the battery pack for the electric vehicle drive system 10 can provide power greater than, for example 500 kW.

Each of the battery modules 38 may be assembled with an interface, such as a board or plane (not shown), that is configured to gather various battery module telemetry data such as voltage, current, charge, temperature, etc. to be communicated to the module monitoring boards 36. In the illustrated embodiment, the module monitoring boards 36n_1, 36n_2, . . . , 36n_k communicate with the string control unit 34n using a communication protocol, such as isoSPI. In the illustrated embodiment, the module monitoring boards 36n can gather, for example, temperature and voltage data of the respective modules 38n and communicate them to the string control unit 34n. Also in some embodiments, analog measurement data from the battery modules 38n and the battery string 26n can be processed with the ADC 32n for further digital processes at the string control unit 34n and the battery pack controller 31, for example. In some embodiments, the module monitoring boards 36n can be individually and directly in communication with the string control unit 34n, and in other embodiments, the module monitoring boards 36n can be collectively and/or indirectly in communication with the string control unit 34n through a communication bus or in a daisy chained configuration.

The string control unit 34n can be a processor configured to monitor status of the battery modules 38n and the battery string 26n, test and monitor isolation of the battery string 26n, manage temperature of the battery modules 38n and the battery string 26n, execute battery management algorithms, and generate the control signal 24n for controlling one or both of the switches 21n and 22n of the battery string 26n. Similarly, the respective string control units 34a, 34b, . . . , 34n, . . . for the battery strings 26a, 26b, . . . , 26n, . . . illustrated in FIG. 2 can perform the same functions for the respective battery strings 26 so that the battery management system 16 as a whole outputs the control signals 24a, 24b, . . . , 24n, . . . from the respective string control units 34a, 34b, . . . , 34n, . . . to the corresponding switches 21a, 21b, . . . , 21n, . . . , and 22a, 22b, . . . , 22n, . . . . In the illustrated embodiment, the string control unit 34n can also be in communication with the current sensor 28n and receive, for example, the current reading I_n of the battery string 26n. Also, the string control unit 34n can be coupled to the fuse 31n to receive, for example, an indication of a tripped circuit or a blown fuse.

The battery pack controller 31 in the illustrated embodiment can be in communication with the plurality of string control units 34a, 34b, . . . , 34n, . . . . In some embodiments, various data from the one or more of the battery strings (e.g., string_a, string_b, . . . , string_n, . . . ) can be communicated using CAN buses and the battery management system 16 may include a plurality of CAN bus transceivers (not shown). The battery pack controller 31 is also coupled to the switch driver 35, which can provide power to the switches 21 and 22 (e.g. contactors) of the battery strings 26, and the battery pack controller 31 can be in further communication with other devices, components, or modules of the electric vehicle. In certain instances, the battery pack controller 31 can communicate to the switch driver 35 to cut power and disconnect all the switches 21 and 22. For example, when the battery pack controller 16 may be configured to disconnect all the switches 21 and 22 when it receives a signal that indicates an air bag is deployed. Also, in certain instances, the string control unit 34*n* may receive high temperature data from one of the modules 38*n* and send a warning signal to the battery pack controller 31. In such instances, the built-in redundancy of the multi-string battery structure and the battery management system allows disconnecting the potentially troubling battery string without affirmatively determining whether disconnecting the battery string is required.

It can be advantageous to implement a battery management system for an electric vehicle as disclosed herein. With conventional thinking, the parallel system looks like it will cost n times the cost of a conventional system, where is n is the number of parallel strings. However, in most safety critical Lithium battery system, redundancy is typically needed anyway, to improve false positive or negative trips. Also, the battery pack split into multiple battery strings allows use of lower current contactors, reducing cost while increasing modularity. In traditional systems with lithium batteries, if a voltage sensor fails, most battery management systems are forced to open switches or contactors of the whole pack because of a risk of overcharge which can lead to a fire or explosion. Because of this, traditional systems include a redundant voltage measurement. The voltage measurement could be another board such as an additional module monitoring board, or a Hardware Overvoltage device on the cell level.

With a multi-string system, in case of a broken voltage sensor or current sensor or temperature sensor, one string can be independently taken out of the pack and the battery pack still delivers power with the remaining strings. With a battery management system implemented as disclosed herein, added voltage redundancy may not be necessary for reliability because the level of redundancy is already built into the multi-string management system. If a voltage sensor fails, a cautious approach may be taken, removing the string, and the vehicle will still have power for the application from the remaining strings.

By avoiding redundant temperature, voltage and current sensors in a multi-string battery pack, costs can be kept low while reliability and safety can be increased. The control unit can be programmed to be safer than traditional systems, with the ability to independently open and close contactors compared to traditional battery management systems, because other strings provide redundant backup.

The multi-string battery structure and battery management system disclosed herein can also be advantageous in providing continuous power to the electric vehicle as the distributed currents in the multi-string structure and the battery management system allow increased continuous power capability of the battery pack. In some instances continuous current draw of over 1 kA can be implemented using the disclosed system. Furthermore, because the multiple battery strings distribute the total output current over multiple branches, the disclosed battery structure and battery management system allows the system to be implemented with components such as fuses, current sensors, and contactors that are cost- and size-effective as the current in one battery string is lower than is present in a non-multi-string system, and thus the individual components in a string need not carry or measure as high a current. For example, with six separate strings each handling 300 A maximum output can produce a total maximum output of 1.8 kA. Although this multi-string system may use six sets of contactors, fuses, and current measurement devices, the total cost of six sets of these devices each suitable for 300 A operation can be lower total cost as well as higher accuracy operation than a single set suitable for 1.8 kA operation. Also, the built in redundancy, among other features, of the system disclosed herein allows high reliability as faulty strings can be disconnected and removed from operation while the remaining strings can continue to provide power to the electric vehicle. The multi-string battery structure and the battery management system also allow modularity, adaptability, and scalability depending on the size and type of the vehicle and the level of power needed for the vehicle's intended use. The battery management system disclose herein provides the benefits of having multiple battery strings while effectively and efficiently managing a great number of contactors and fuses.

Figure 3B:
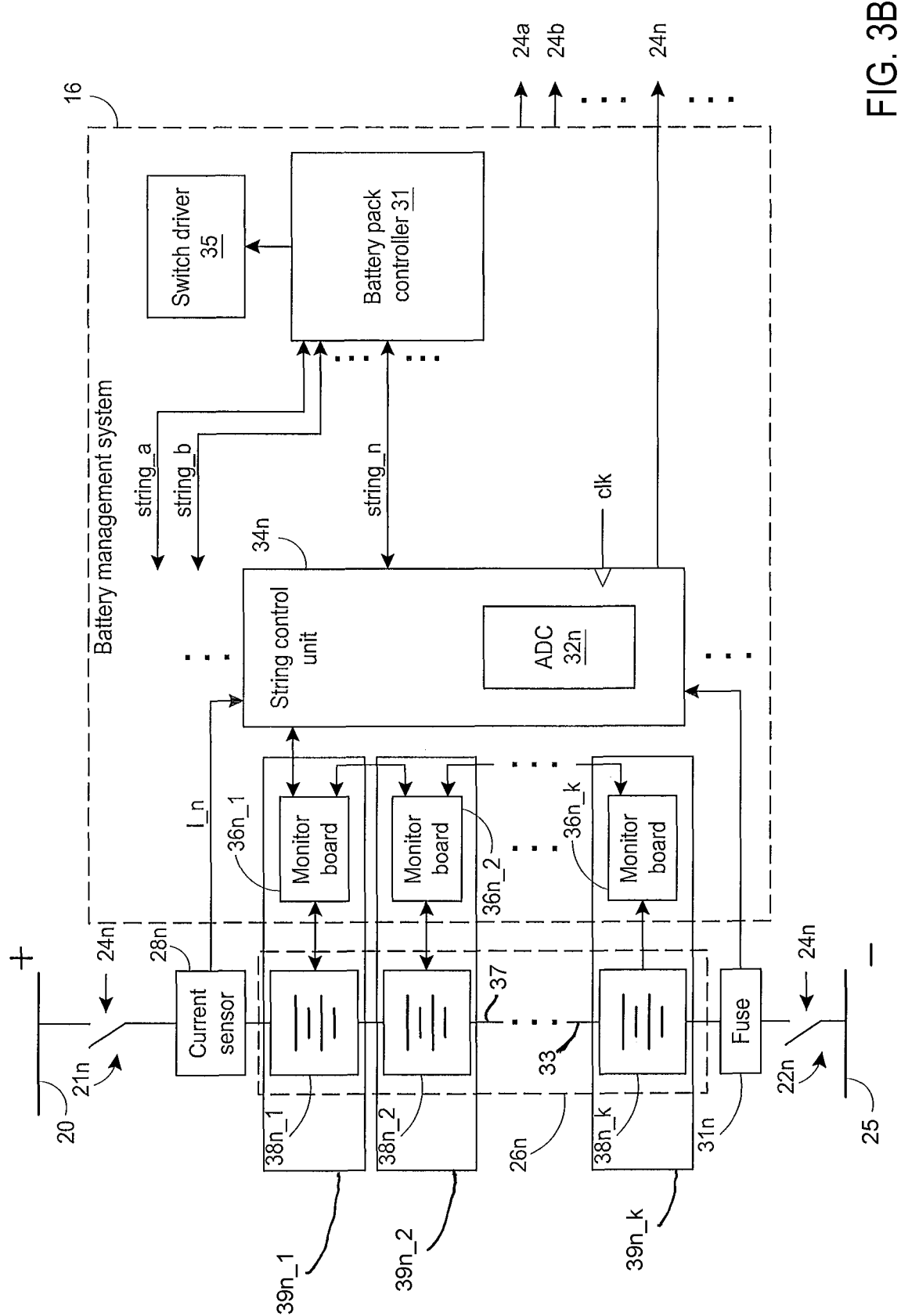

FIG. 3B is a block diagram of an example voltage source and battery management system such as shown in FIG. 3A wherein the module monitoring boards 36 are provided in the same enclosure with the respective batteries they are associated with and collect data from to form coupled modules $39_{n\_1}$ through $39_{n\_k}$. Data transfer between the monitoring boards 36 and the string control unit 34 may be provided by a daisy chain bus that enters and exits each module 39. Each module 39 further has a positive power terminal 33 and a negative power terminal 37 which mate adjacent modules with a series electrical connection as will be described further below.

Figure 4A:
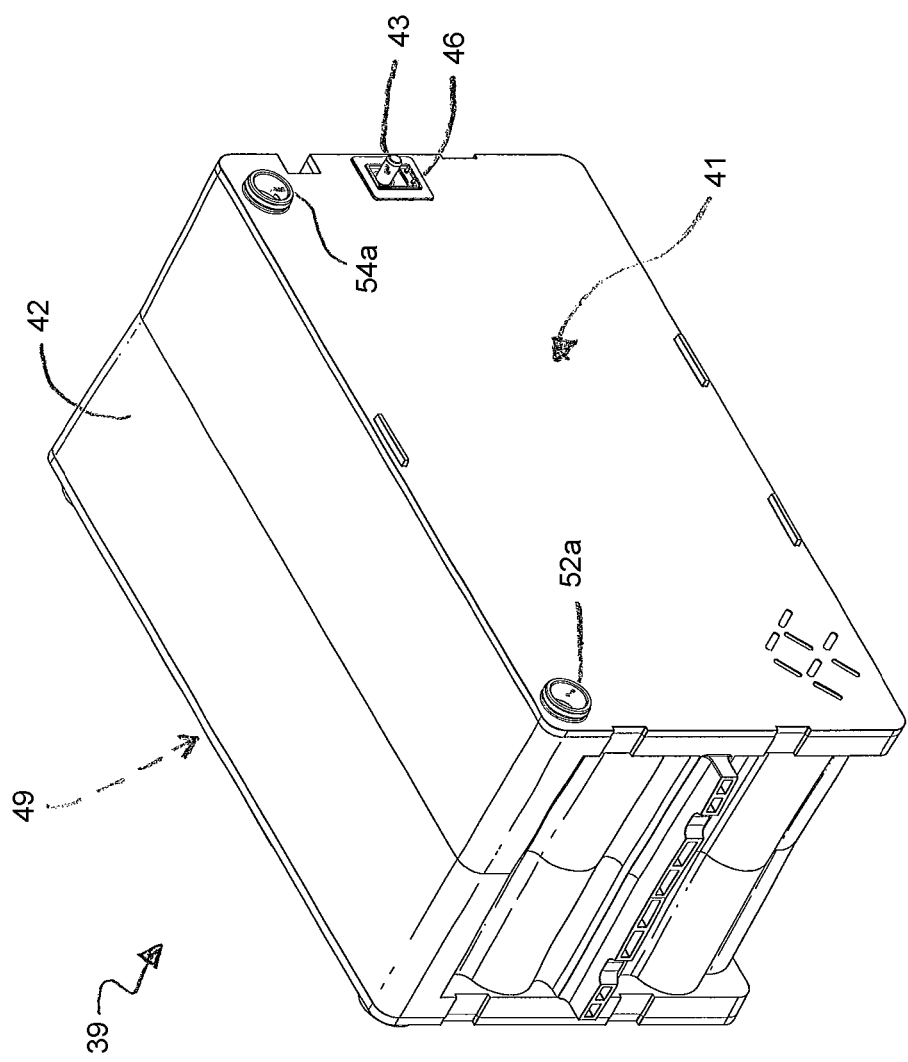
FIGS. 4A to 4C illustrate an external view of one exemplary physical implementation of the module shown in FIG. 3B.
Figure 4B:
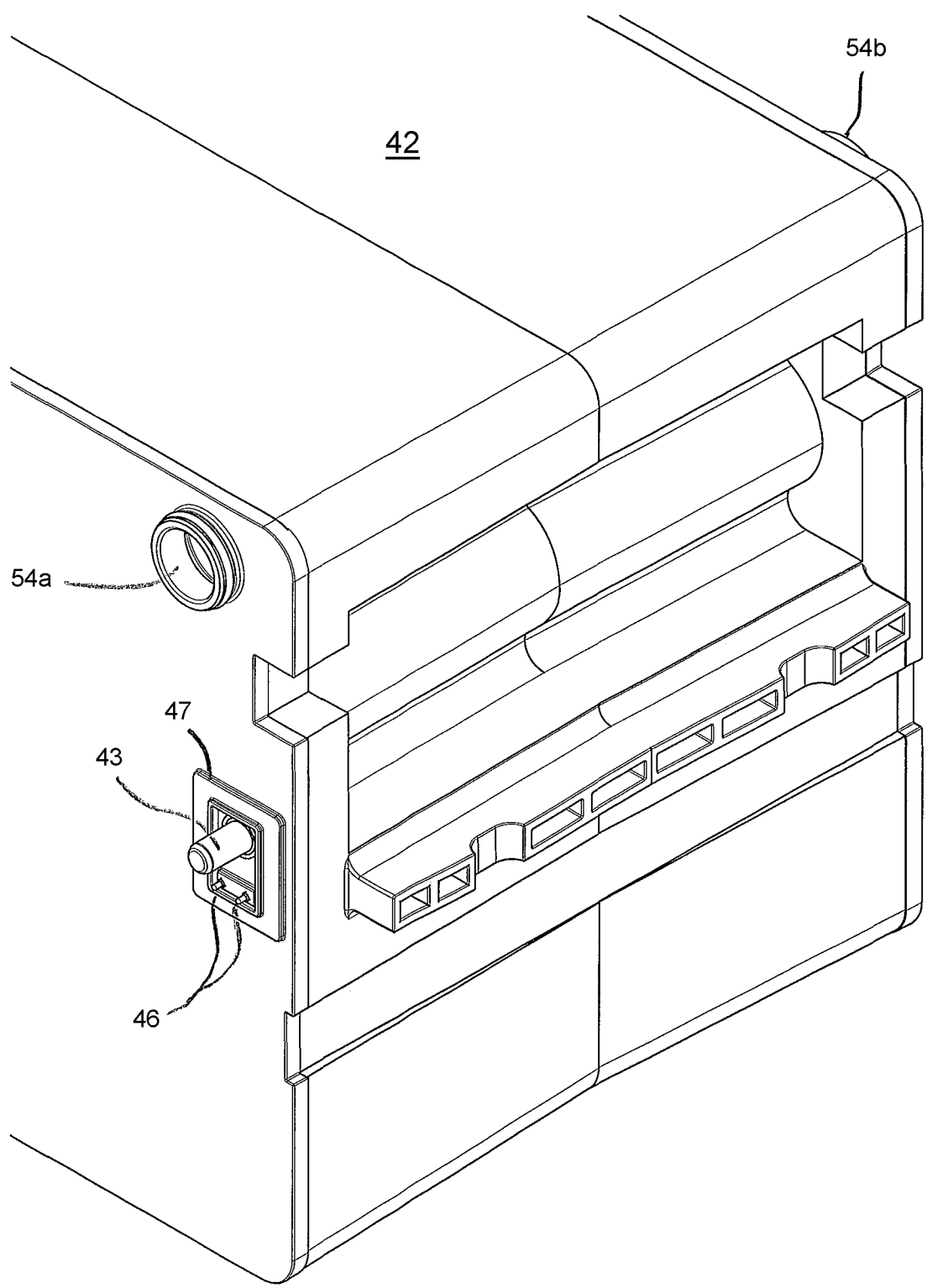
Figure 4C:
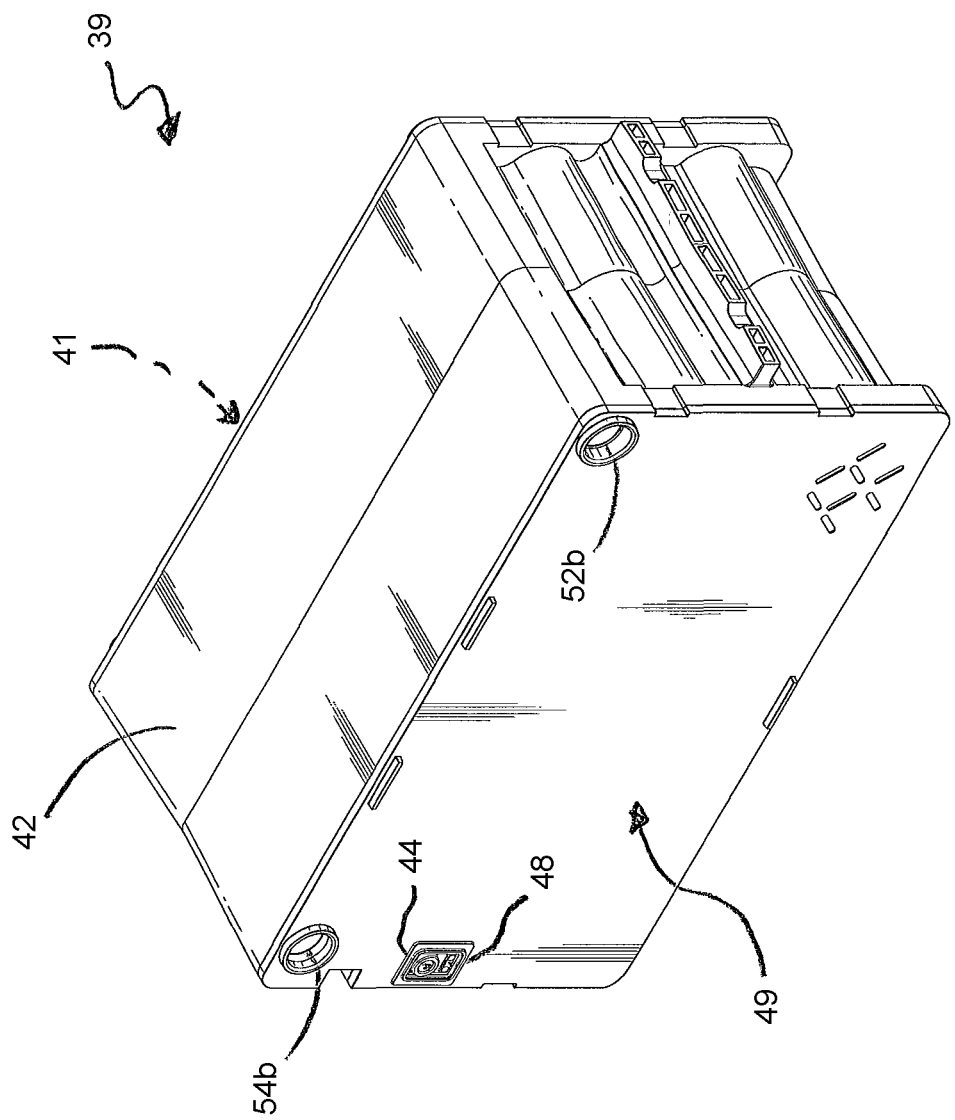

FIGS. 4A to 4C illustrate an external view of one exemplary physical implementation of a module 39 from FIG. 3B. The module 39 has a housing 42, which may be a molded polymer housing. One side 41 of the housing, which will be referred to herein as the "plug side," includes a power terminal 43 provided in the form of a plug, which may form the positive power terminal 33 of FIG. 3B for example. Beneath the output terminal 43 are data input/output plug(s) or pin(s) 46, which in this example form a two wire data bus connection. This portion of the module is shown in more detail in FIG. 4B. Visible in FIG. 4B surrounding the power terminal 43 is a window 47 which forms a fluid tight seal against an inner frame (not shown in FIG. 4) sealing the inside of the housing 42 from the outside of the housing 42 as will be explained further below. Referring back to FIG. 4A, also provided on the plug side 41 are a first opening 52*a* to a first coolant flow channel in the housing and a second opening 54*a* to a second coolant flow channel in the housing. These openings 52*a*, 54*a* may also be formed as plugs. As will be described further below, one of these coolant flow channels may introduce cooling fluid into the housing, while the other coolant flow channel may allow cooling fluid to exit the housing.

On the opposite side of the module 39 from the plug side 41 is a "socket side" 49. This side is illustrated in FIG. 4C. The socket side 49 includes a power terminal 44 provided in the form of a socket, which may form the negative power terminal 37 of FIG. 3B for example. Beneath the power terminal 44 are a pair of data input/output sockets 48. These sockets may be sealed with an inner frame and an outer frame 47 in the same manner as the plugs 43 and 46 on the plug side. Also provided on the socket side 49 are a first opening 52*b* to the first coolant flow channel in the housing and a second opening 54b to the second coolant flow channel in the housing. These openings 52a, 54a may also be formed as sockets.

To form a string 26 of modules 39, a plurality of modules can be arranged in an adjacent manner, with the plugs on the plug side of one module mating with the sockets on the socket side of an adjacent module. This connects positive and negative power terminals in series and daisy chains the data input/outputs as shown in FIG. 3B. The fluid couplings between plugs 52a and 54a of one module and sockets 52b and 54b of an adjacent module form continuous fluid inlet and outlet manifolds extending along the string. Any number of modules can be mated together in a series to form a string 36. In one implementation, six adjacent modules 39 form a string 26. At one end of such a string will be a positive power terminal (on the "positive end module") and at the other end of the string will be a negative power terminal (on the "negative end module"). These power terminals can be electrically coupled to the respective positive and negative bus bars 20 and 25 as shown in FIG. 3B. Any number of such strings can be placed adjacent to each other in a dimension perpendicular to the length of each string, to form a multiple string battery pack as illustrated in FIG. 2.

Figure 5:
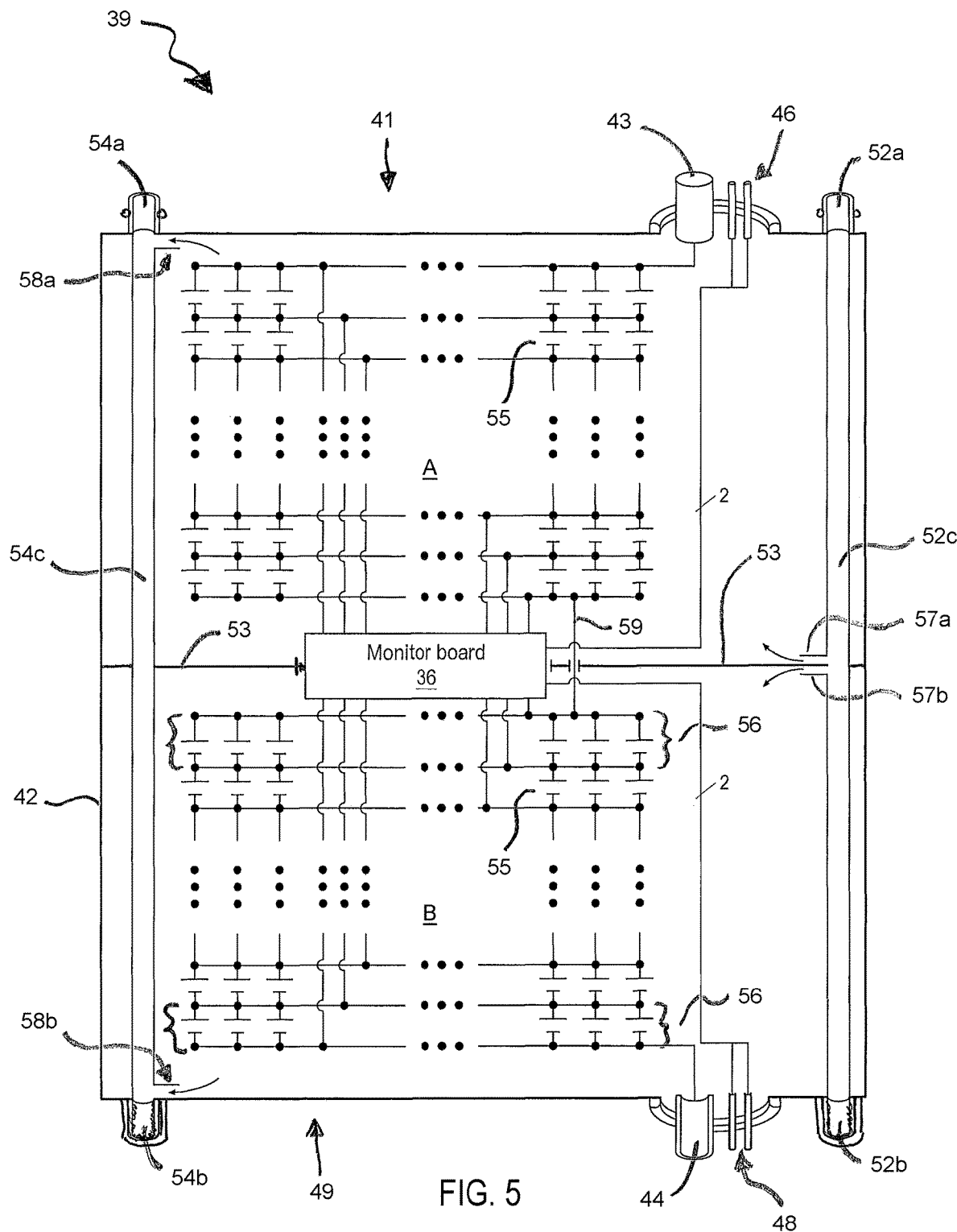
FIG. 5 is a combination block diagram and schematic illustrating example battery electrical connections and some aspects of physical component layout of a module.

FIG. 5 is a combination block diagram and schematic illustrating example battery electrical connections and some aspects of physical component layout of a module 39. The housing 42 may be molded as two half modules denoted A and B in FIG. 5 that are separated by an inner wall 53. Running along the length of the module 39 on each side and through the inner wall 53 are coolant fluid channels 52c and 54c. The outer housing shell, the inner wall 53, and the coolant fluid channels 52c and 54c may be molded as one monolithic polymer piece.

Each half module may contain a plurality of connected battery cells 55. In one implementation, sets of battery cells 56 of the plurality of battery cells are connected in parallel. These parallel connected sets are referred to herein as "bricks." In each half module, a collection of bricks 56 may be connected in series. It will be appreciated that any number of parallel connected battery cells may form a brick, and any number of bricks may be connected in series in each half module depending on the desired output voltage and output current capacity is desired. In one implementation, a brick is twelve parallel connected lithium ion cells, and each half module contains eight bricks connected in series.

In the implementation of FIG. 5, the series connected bricks in each half module are further connected in series with a connection 59 that extends into both of the two half modules A and B as described further below. The negative side of the most negative brick 56 is connected to the negative output terminal of the module, which may be socket 44. The positive side of the most positive brick is connected to the positive output terminal of the module, which may be plug 43. In one specific implementation, this results in sixteen bricks of twelve parallel cells each connected in series between terminal 43 and terminal 44 of the module.

The module monitoring board 36 may connect to each side of each brick to measure the voltage across each brick. Thus, the module monitoring board 36 may also extend into both of the two half modules A and B as also described further below. The module monitoring board 36 may also connect to temperature or a variety of other sensors (not shown) placed in each half module. The module monitoring board 36 also connects to the input/output connections 46 and 48 on the plug side 41 and socket side 49 of the module 39.

During operation, the battery cells 55 may be cooled by being submerged in a cooling fluid so as to have direct contact between the cell housings and the cooling fluid. This is in contrast with having the cooling fluid routed through closed channels where only the channel walls are in direct contact with the cell housings. To implement this, a fluid inlet channel 52c includes at least one opening 57a and 57b between the channel 52c and the interior of each half module in an area proximate to the inner wall 53. The term "proximate to" in this context means that at least some of the opening 57a or 57b is positioned closer to the face of the inner wall 53 in that half module than at least some of the battery cell 55 housings in that half module. The openings 57a and 57b may abut the face of the inner wall 53. The openings 57a and 57b may be located at least partly between all the battery housings in a half module and the respective face of the inner wall 53 such that the openings 57a and 57b are located at least partly "under" all the battery housings in that half module. The openings 57a and 57b may be located entirely between all the battery housings in a half module and the respective face of the inner wall 53 such that the openings 57a and 57b are located entirely under all the battery housings in that half module.

Also provided in each half module is at least one fluid outlet opening 58a and 58b. These outlet openings 58a and 58b may be proximate to the other side of each half module from the inlet openings 57a and 57b and remote from the inner wall 53. The term "remote from" in this context means that at least some of the opening 58a or 58b is positioned closer to the outer face of the module in that half module than at least some of the battery cell 55 housings in that half module. The openings 58a and 58b may abut the inner face of an outer panel of the module. The openings 58a and 58b may be located at least partly between all the battery housings in a half module and the outer face of the module such that the openings 58a and 58b are located at least partly over all the battery housings in that half module. The openings 58a and 58b may be located entirely between all the battery housings in a half module and the outer face of the module such that the openings 58a and 58b are located entirely over all the battery housings in that half module. With this configuration, cooling fluid enters the half modules proximate to the inner wall 53, is pushed over the battery cells for cooling and then out of each half module on the other side of the battery cells near the outer face of the module. It is advantageous to have the channels 52c and 54c be positioned vertically near the top of the module (relative to the ground) when the modules are packaged into strings and packs installed in a vehicle, as then gravity assists in ensuring that each half module is completely filled with cooling fluid to submerge all the batteries in each half module.

Figure 6:
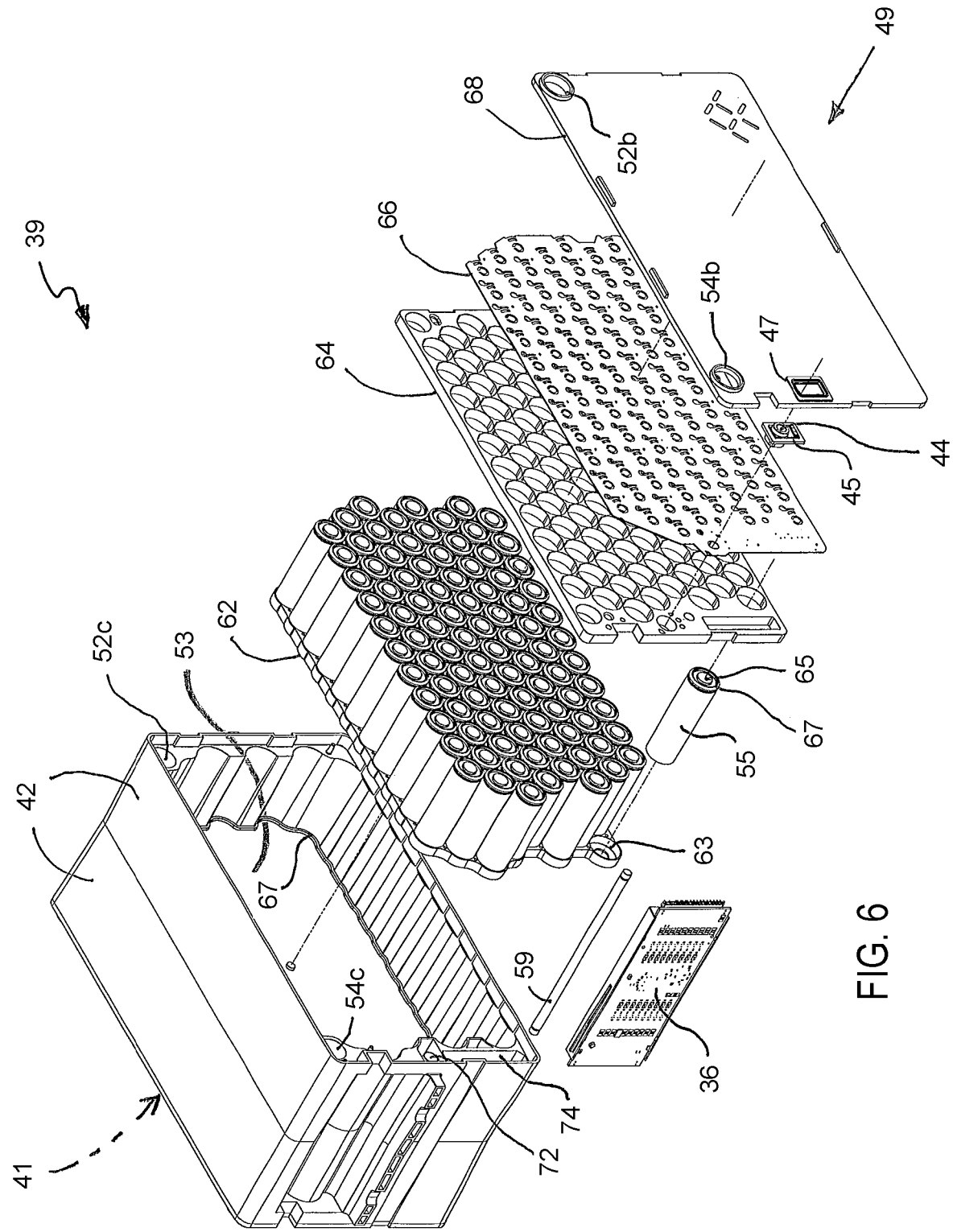
FIG. 6 is an exploded view of the components of one half module, illustrating one example physical construction thereof.

FIG. 6 is an exploded view of the components of one half module (in this example it corresponds to module B of FIG. 5) illustrating one example physical construction thereof. The housing 42 has a cavity for the half module components which has the internal wall 53 at the far end thereof. A lower battery holder 62 has recesses 63 to hold the bottom ends of cylindrical batteries 55. The battery bottom ends may be secured into the recesses with adhesive. The batteries may have both a positive terminal 65 and a negative terminal 67 on their upper ends. The lower battery holder 62 is dropped into the cavity and rests on a shoulder 67 at the junction of the inner wall 53 and the housing 42 forming the cavity and the batteries 55 are installed therein.

The module monitor board 36 is placed in a slot 74 which may be integral to the housing 42 and that extends from the printed circuit plane 66 to the printed circuit plane (not shown) in the other half module on the other side of the inner wall 53. Connectors on each side of the module monitor board 36 are coupled to mating connectors on the underside of the printed circuit planes. The connection 59 of FIG. 5 that connects the two half modules in series may be implemented with a conductive metal (e.g. copper) rod (designated 59 in FIG. 6 also). The rod 59 is coupled to the underside of the printed circuit planes of each half module, and extends between them in a channel 72 which may be similar in configuration as the above described slot 74 but sized and shaped for the rod 59 instead of the module monitoring board 36.

An upper battery holder 64 slides over the tops of the cylindrical batteries 55. On top of this upper battery holder 64 is a printed circuit plane 66, which may be a flex circuit. Metal (e.g. copper) traces on the flex circuit form the circuit connections illustrated in each half module shown in FIG. 5. Contacts may be provided in or on the printed circuit plane that can be electrically coupled to the positive terminals 65 and negative terminals 67 of the batteries 55 by, for example, laser welding. An output terminal, in this example the socket 44 described above, is provided on the flex circuit on a polymer mount that has a frame 45 around its perimeter. The polymer mount is sealed to the surface of the printed circuit 66 in a fluid tight manner with adhesive and/or other means such as laser welding around the perimeter of the frame 45. A cover 68 is placed over the printed circuit plane 66 and is sealed to the housing 42 at the top of the cavity containing the above described components. The inner face of the cover 68 around the window 47 rests on the frame 45 around the power and data connectors. The perimeter of the window 47 may then be liquid tight sealed such as by laser welding to the top surface of the frame 45, thereby sealing against leakage the half module cavity to implement fully submerged battery cooling.

Figure 7:
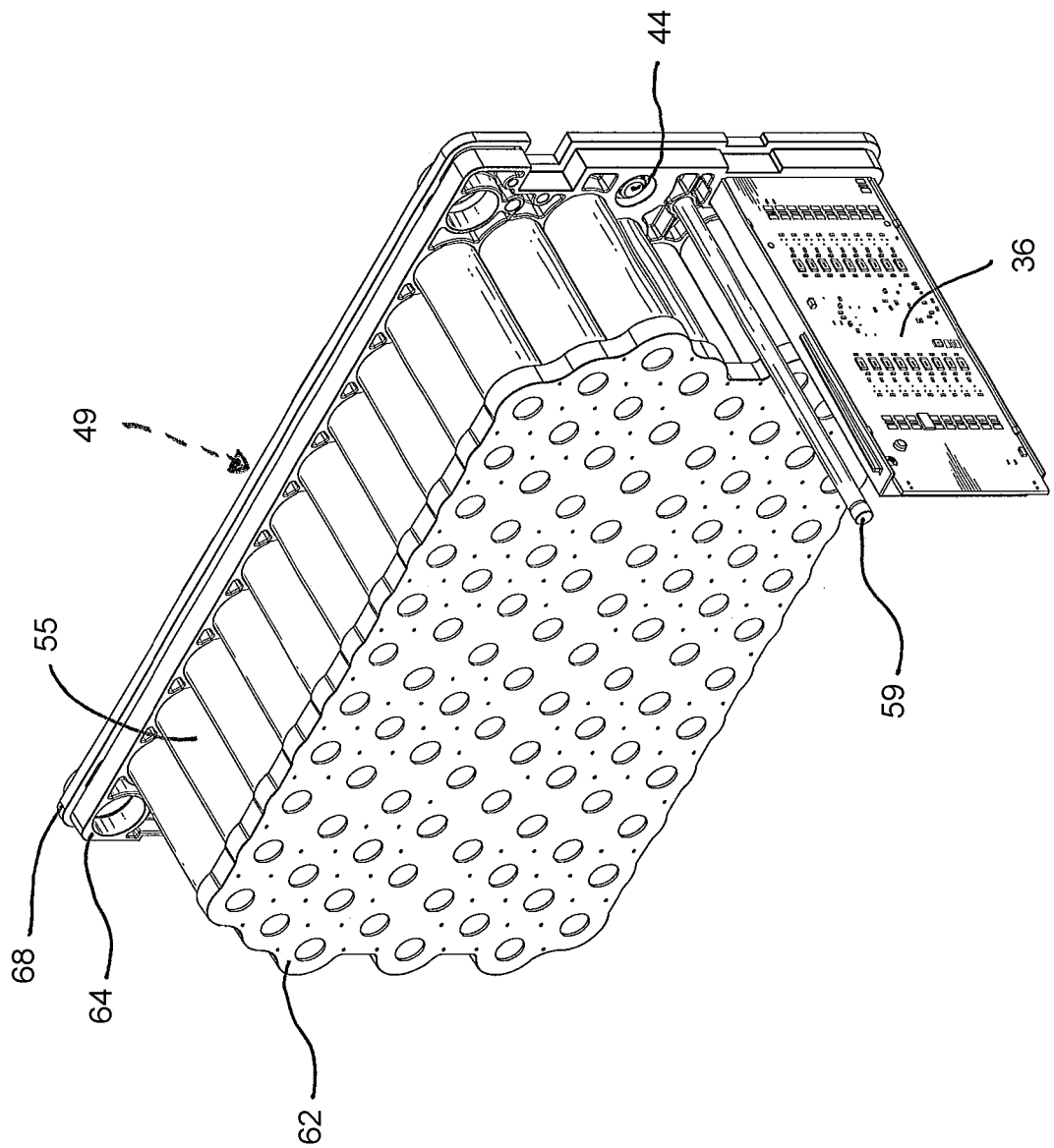
FIG. 7 illustrates the components of FIG. 6 in an assembled configuration.

FIG. 7 illustrates the components of FIG. 6 in an assembled configuration without the housing 42 surrounding them. The printed circuit plane 66 is positioned between the upper battery retainer 64 and the cover 68. The connection rod 59 and the module monitoring board 36 extend through the upper battery retainer 64 and connect to the bottom side of the printed circuit plane 66.

Figure 8:
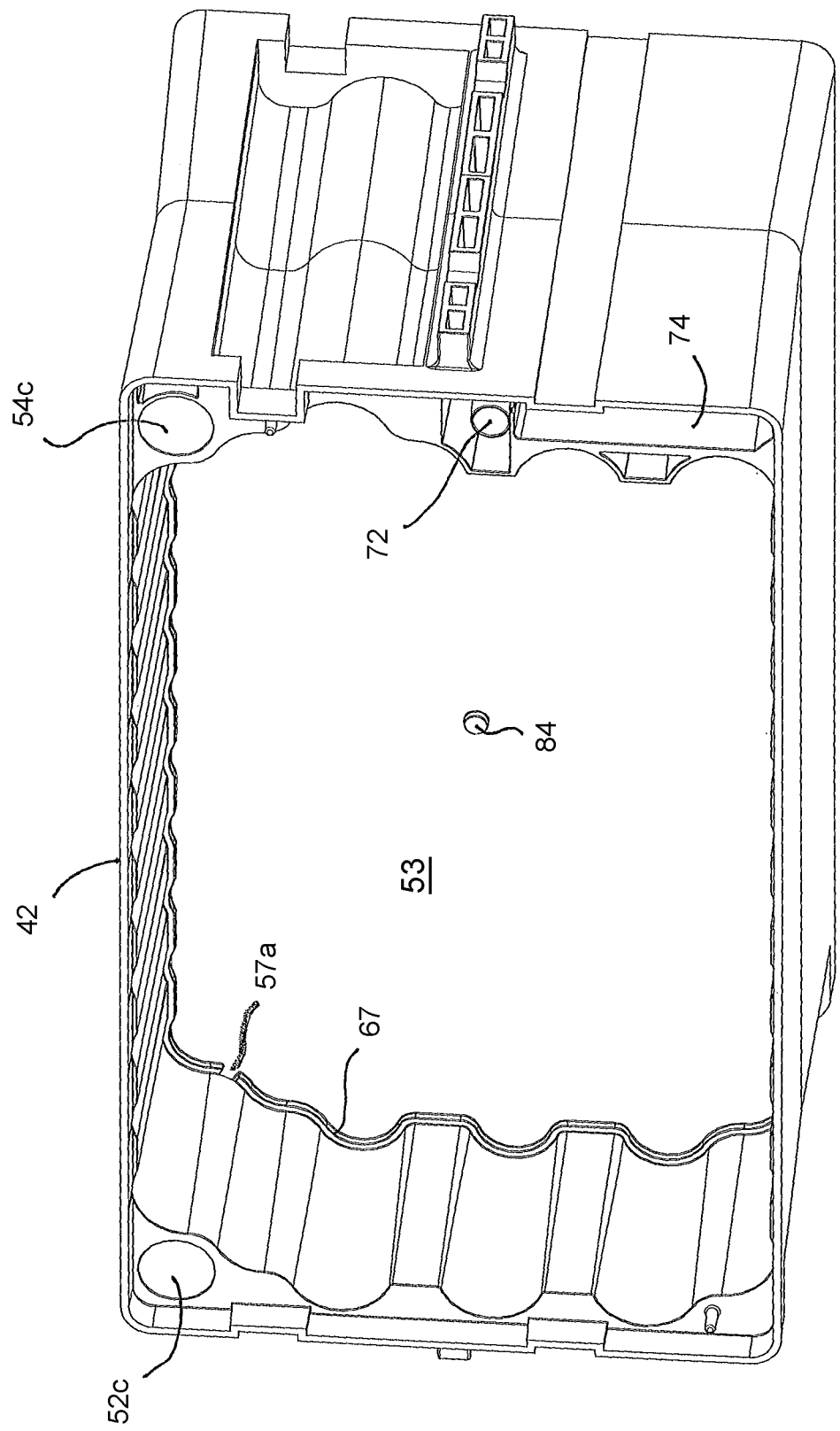
FIG. 8 shows a plug side cavity of the housing with no components installed.

FIG. 8 shows the plug side cavity of the housing 42 with no components installed. The shoulder 67 runs along the bottom of the cavity along the wall. The bottom battery retainer 62 may sit on this shoulder 67 and may also rest on a pad 84 in the middle, thereby forming a gap between the face of the inner wall 53 and the bottom of the bottom battery retainer 62. A cooling fluid channel 57a (e.g. also shown in FIG. 5) extends along the inner wall 53 through the shoulder 67 and through the wall of the cooling fluid channel 52c to fluidly connect the cooling fluid channel 52c in the area proximate to the inner wall 53 and at least partially aligned with the gap between the bottom of the bottom battery retainer 62 and the inner wall 53 described above.

Figure 9:
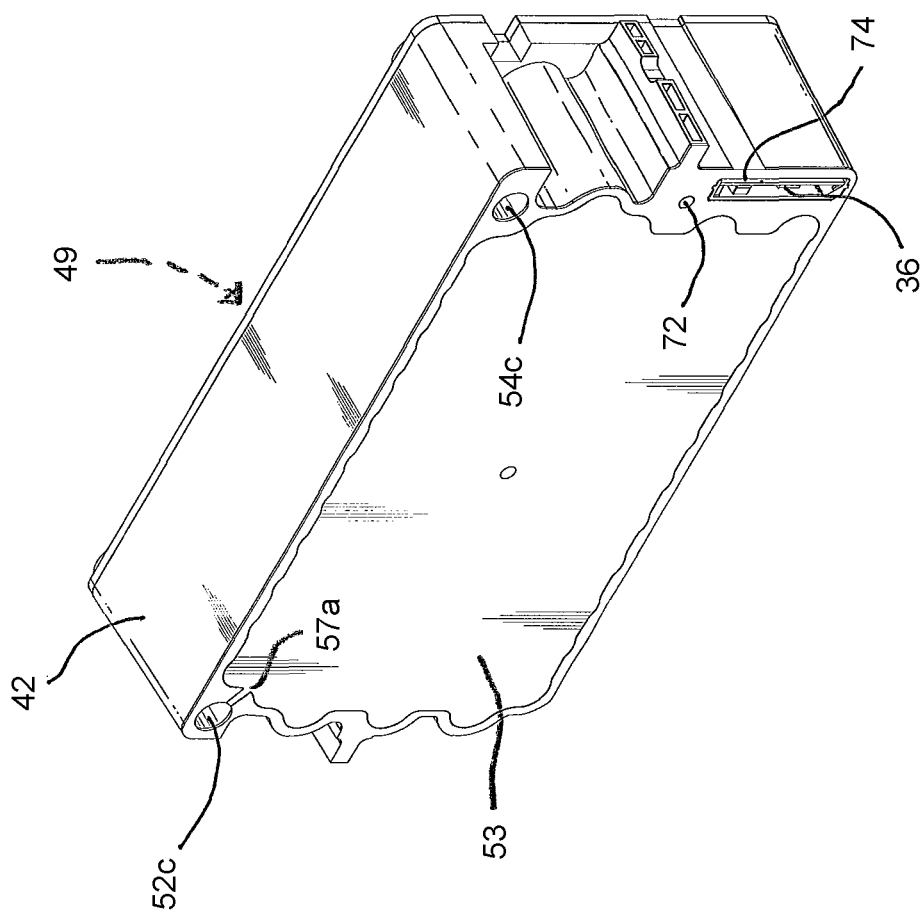
FIG. 9 shows the bottom of the plug side cavity of FIG. 8, with the enclosure cut away.

FIG. 9 shows the bottom of the plug side cavity of FIG. 8, with the housing 42 cut away proximate to the inner wall 53 through approximately the center of the shoulder 67. As seen in FIG. 9, the channel 57a extends through the wall separating the inside of the cooling fluid channel 52c and the interior of the half module.

Figure 11A:
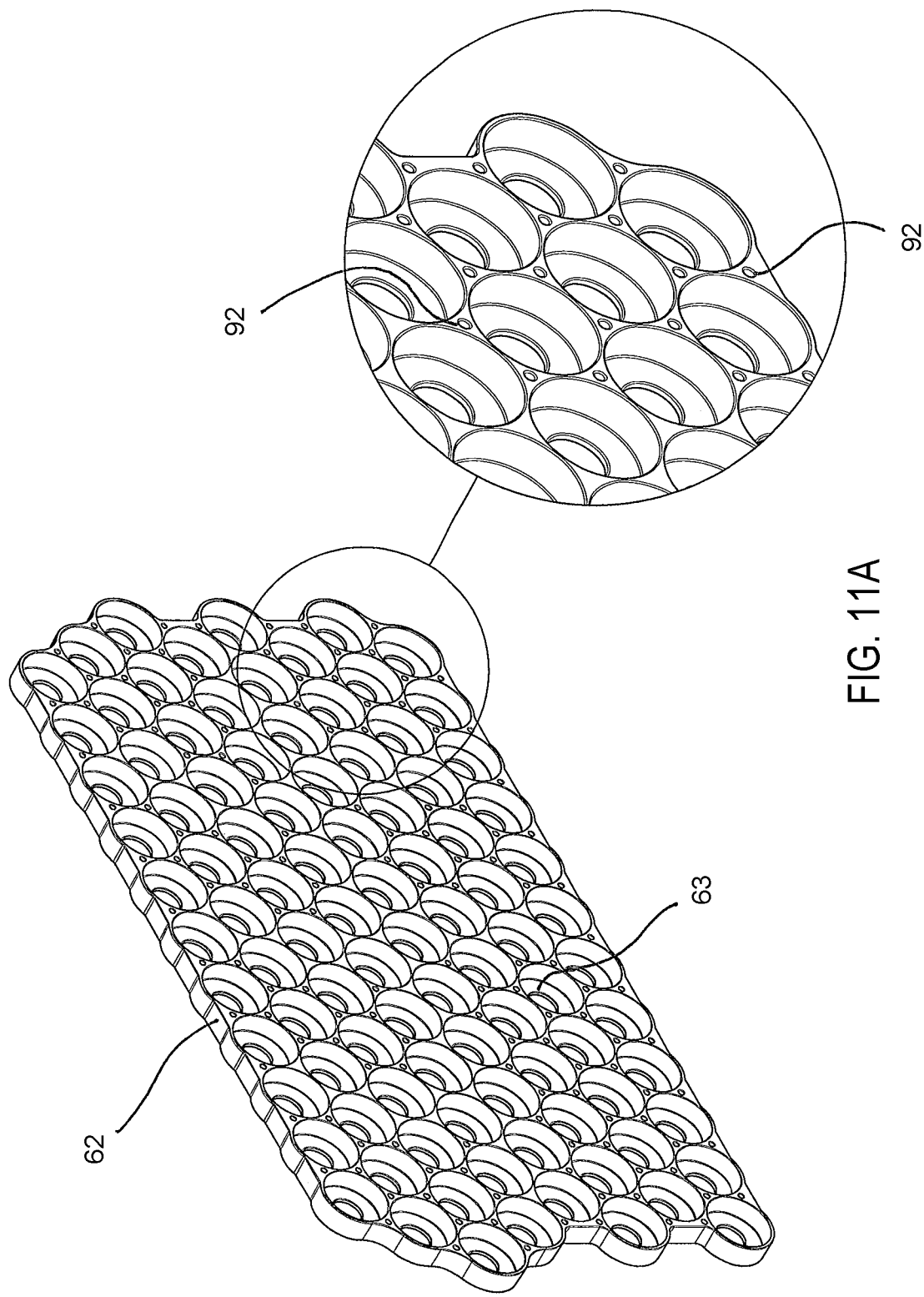
FIGS. 11A and 11B illustrate the bottom battery retainer further outside of the enclosure.
Figure 11B:
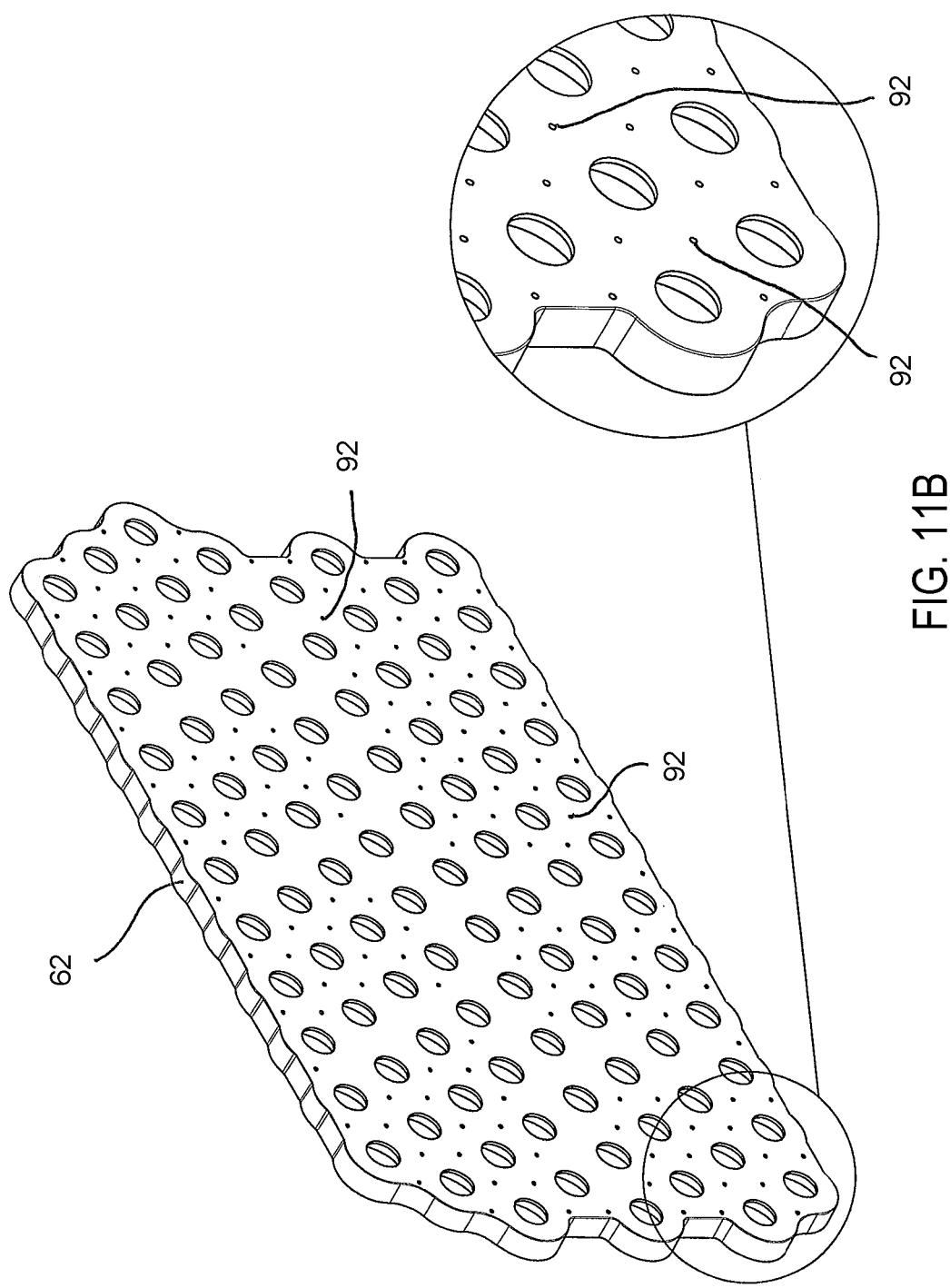

FIG. 10 shows a housing 42 with a bottom battery retainer 62 installed in the cavity. The battery bottoms can rest in recesses 63. The bottom battery retainer includes coolant flow openings 92 which allows the coolant to flow over the batteries from underneath. FIGS. 11A and 11B illustrate the bottom battery retainer further outside of the housing 42. FIG. 11B illustrates the back side of the bottom battery retainer 62.

Figure 12:
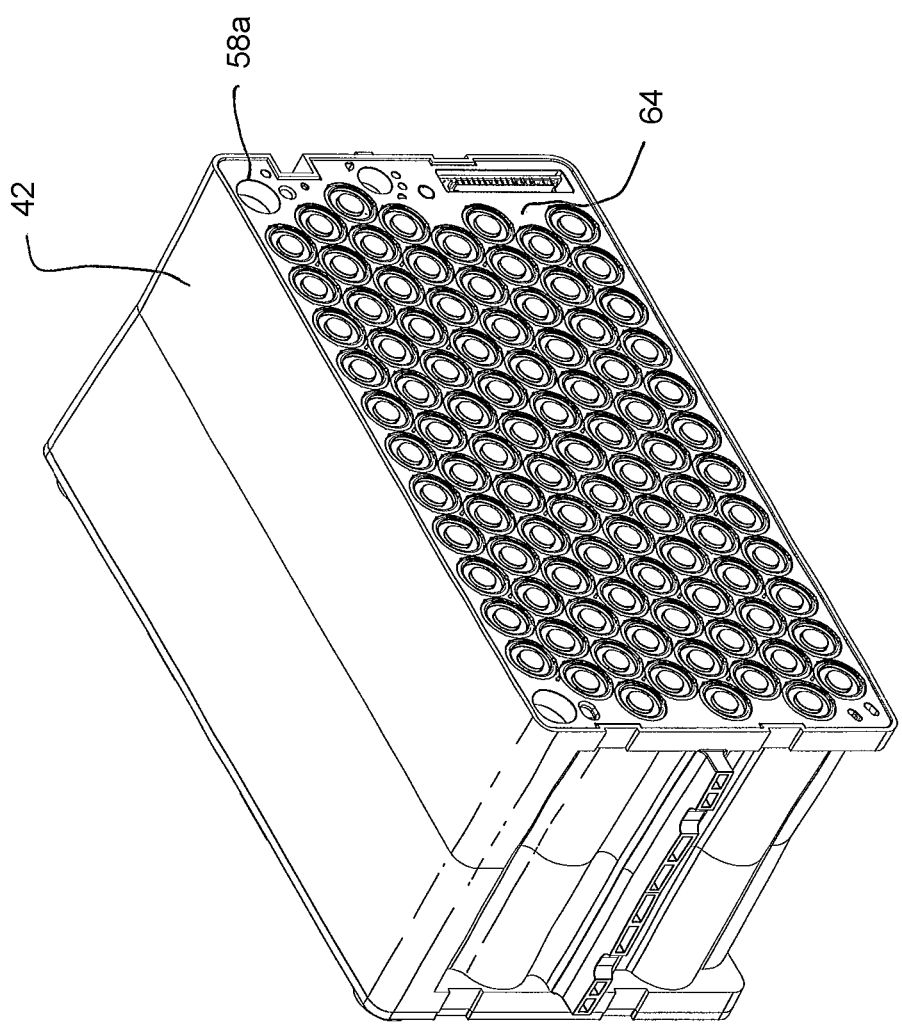
FIG. 12 shows a housing with batteries installed and an upper battery retainer.
Figure 13A:
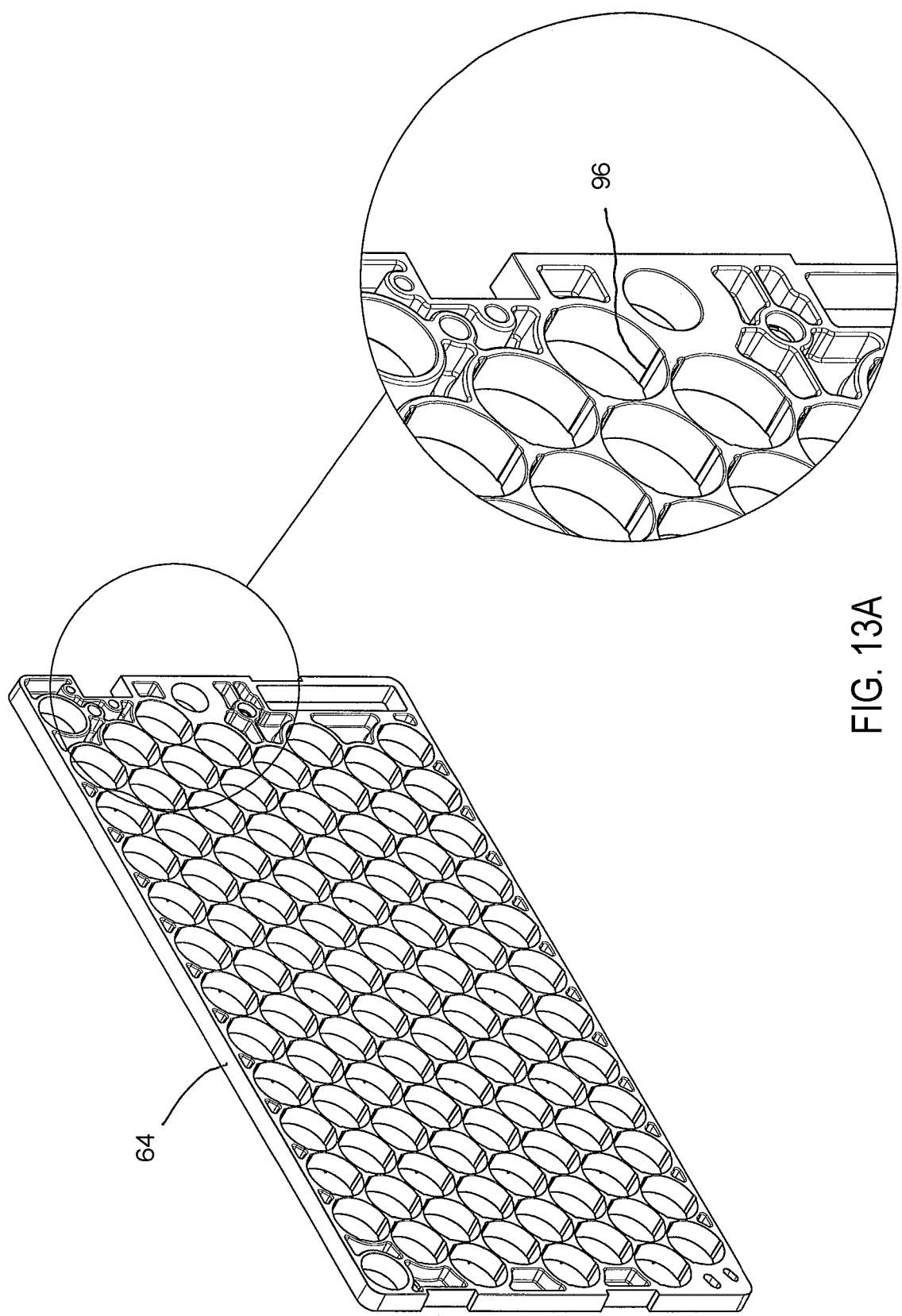
FIGS. 13A and 13B illustrate the upper battery retainer.
Figure 13B:
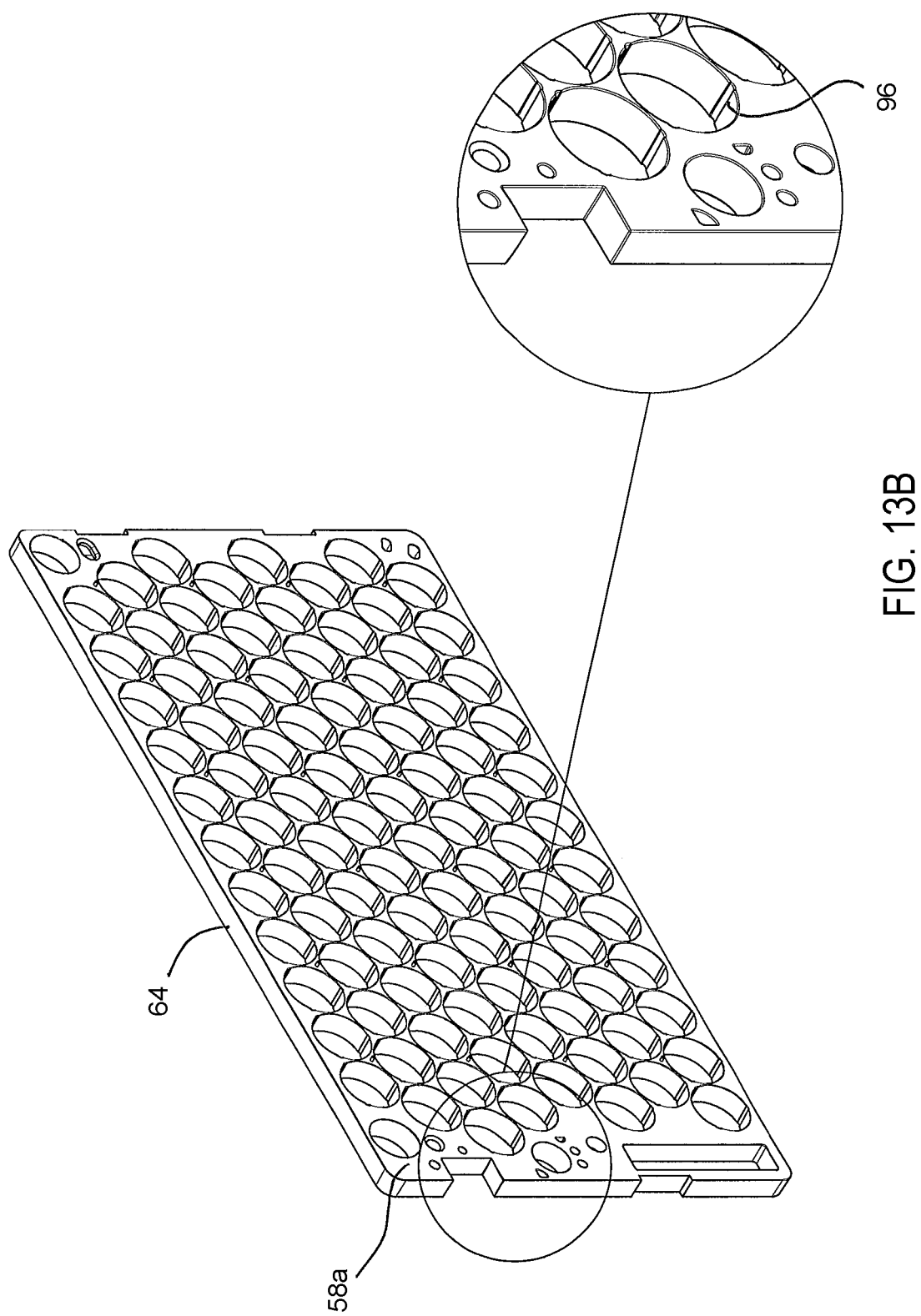

FIG. 12 shows a housing 42 with batteries installed and an upper battery retainer 64 holding the batteries in place. FIGS. 13A and 13B illustrate the upper battery retainer 64. The upper battery retainer has grooves 96 for coolant flow up from the batteries which then flow to the outlet 58a.

Figure 14:
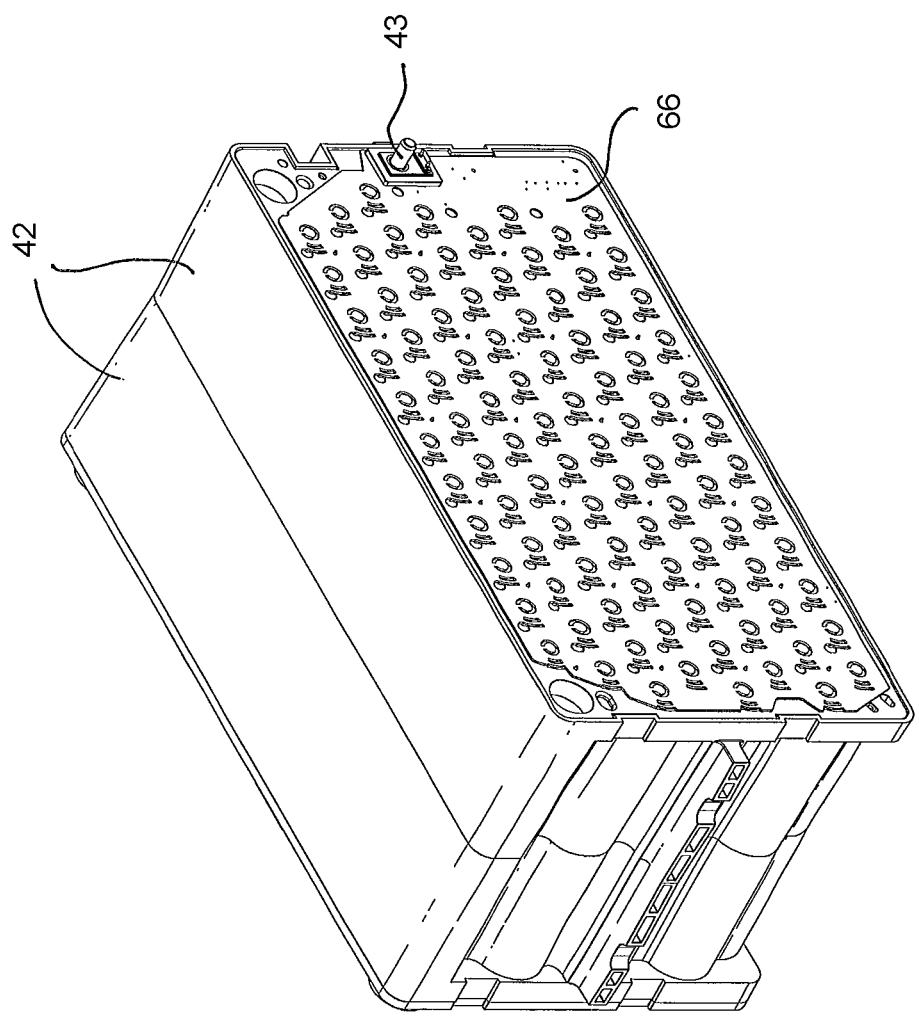
FIG. 14 shows a housing with a printed circuit plane coupled to the tops of the batteries.
Figure 15:
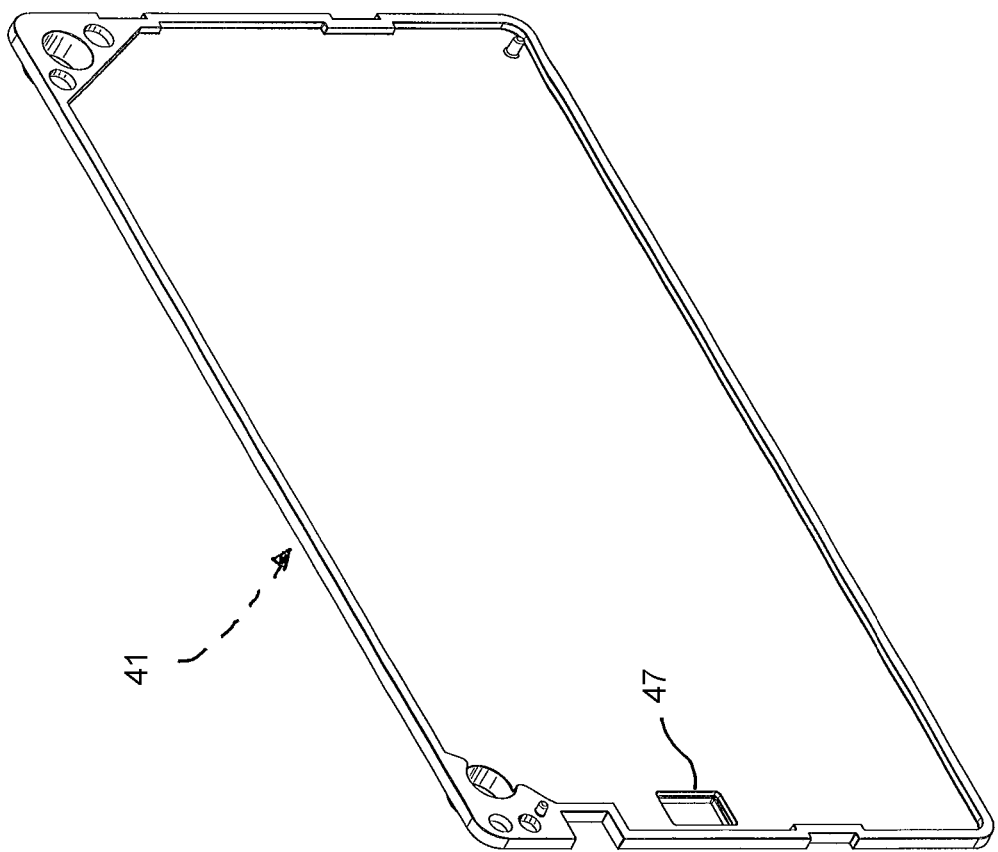
FIG. 15 shows the back side of the cover that is installed over the printed circuit plane.

FIG. 14 shows a housing 42 with a printed circuit plane 66 coupled to the tops of the batteries. FIG. 15 shows the back side of the cover 41 that is installed over the printed circuit plane and may be laser welded to the housing 42 around the edge.

Figure 16:
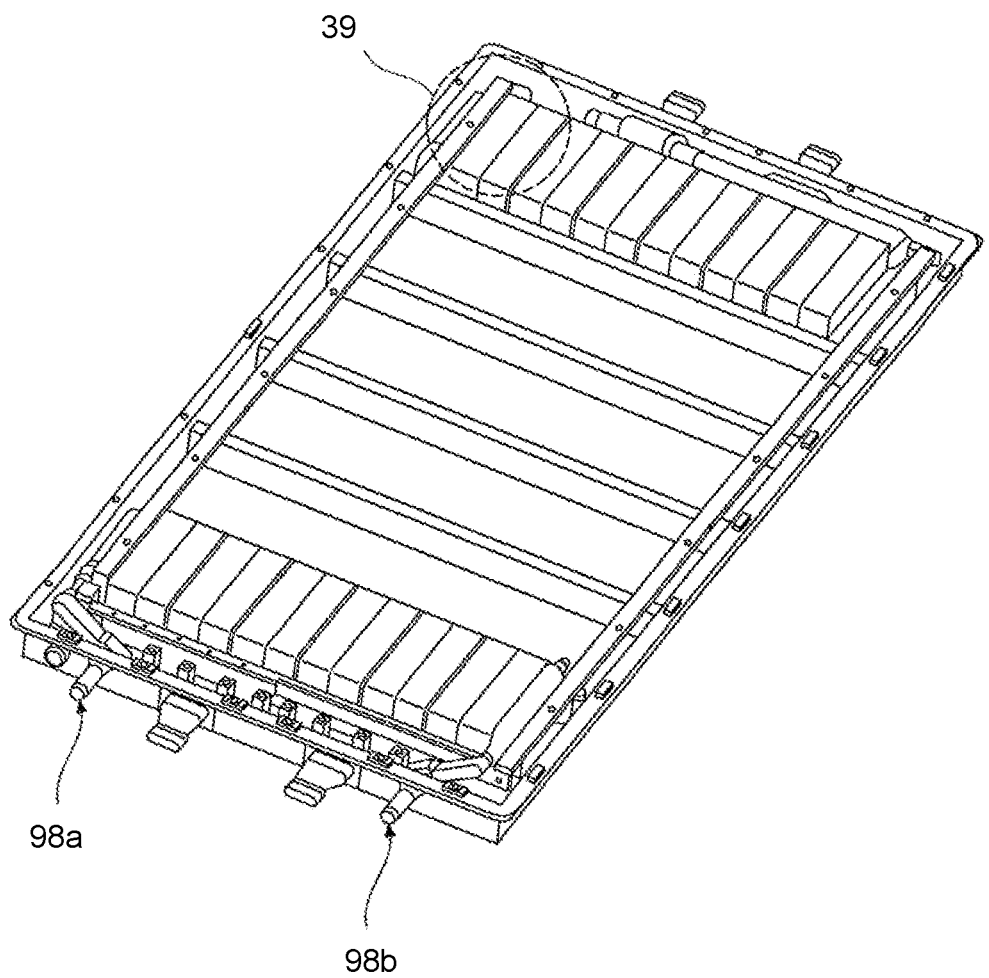
FIG. 16 illustrates a battery tray with multiple strings of multiple modules.

FIG. 16 illustrates a battery tray with multiple strings of multiple modules 39. An inlet and outlet for coolant 98a and 98b are provided for coolant to enter the tray and be distributed among the modules 39 as described above.

The foregoing description details certain embodiments of the systems, devices, and methods disclosed herein. It will be appreciated, however, that no matter how detailed the foregoing appears in text, the devices and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated. The scope of the disclosure should therefore be construed in accordance with the appended claims and any equivalents thereof.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

It is noted that the examples may be described as a process. Although the operations may be described as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc.

It will be appreciated by those skilled in the art that various modifications and changes may be made without departing from the scope of the described technology. Such modifications and changes are intended to fall within the scope of the embodiments, as defined by the appended claims. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged, or excluded from other embodiments.

Those of skill would further appreciate that any of the various illustrative schematic drawings described in connection with the aspects disclosed herein may be implemented as electronic hardware (e.g., a digital implementation, an analog implementation, or a combination of the two, which may be designed using source coding or some other technique), various forms of program or design code incorporating instructions, or combinations of both.

The various circuitry, controllers, microcontroller, or switches, and the like, that are disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both.

The functions described may be implemented in hardware, software, firmware, or any combination thereof. If implemented in software, the functions may be stored on or transmitted over as one or more instructions or code on a tangible, non-transitory computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be in the form of a non-transitory or transitory computer-readable medium.

The term "determining" encompasses a wide variety of actions and, therefore, "determining" can include calculating, computing, processing, deriving, investigating, looking up (e.g., looking up in a table, a database, or another data structure), ascertaining, and the like. Also, "determining" can include receiving (e.g., receiving information), accessing (e.g., accessing data in a memory), and the like. Determining can also include resolving, selecting, choosing, establishing, and the like.

Though described herein with respect to a vehicle, as would be readily appreciated by one of ordinary skill in the art, various embodiments described herein may be used in additional applications, such as in energy-storage systems for wind and solar power generation. Other embodiments will be apparent to those skilled in the art from consideration of the specification and practice of the disclosed current carrier and battery module. It is intended that the specification and examples be considered as exemplary only, with a true scope being indicated by the following claims and their equivalents.

What is claimed is:

1. A battery housing comprising:
   a housing configured to surround at least one battery, the housing having a first side and a second side opposite to the first side;
   a first retainer spaced away from the first side by a first gap, the first retainer having at least one opening therethrough, the first retainer configured to contact a first surface of a battery disposed within the housing;
   a second retainer spaced away from the second side by a second gap, the second retainer having a at least one opening therethrough, the second retainer configured to contact a second surface of the battery that is opposite to the first surface;
   an inlet configured to deliver liquid coolant into the first gap;
   an outlet configured to receive fluid from the second gap, such that a pressurized fluid is capable of entering the inlet and into the first gap, passes through the at least one opening in the first retainer, contacts the battery, passes through the at least one opening in the second retainer, enters the second gap, and exits the outlet to regulate the temperature of the battery; and
   a plurality of module monitor boards placed in a slot integral to the housing, each of the plurality of module monitor boards receiving battery module telemetry data from a corresponding battery module of the battery.

2. The housing of claim 1, further comprising a first fluid path in fluid communication with the inlet, the first fluid flow path disposed within at least one wall of the housing.

3. The housing of claim 2, further comprising a second fluid path in fluid communication with the outlet, the second fluid flow path disposed within at least one wall of the housing.

4. The housing of claim 3, wherein the first fluid path and the second fluid path are disposed within walls that are on opposite sides of the housing.

5. The housing of claim 4, further comprising a plurality of cylindrical batteries disposed within the housing.

6. The housing of claim 5, further comprising a circuit disposed within the first or second gap, the circuit configured to electrically connect the plurality of cylindrical batteries.

* * * * *